(12) United States Patent
George et al.

(10) Patent No.: US 10,374,913 B2
(45) Date of Patent: Aug. 6, 2019

(54) DATA RETENTION PROBES AND RELATED METHODS

(71) Applicant: Telesoft Technologies Ltd, Blandford Forum-Dorset (GB)

(72) Inventors: Matthew George, Blandford-Dorset (GB); John Townsend, Blandford-Dorset (GB); John Allen, Blandford-Dorset (GB)

(73) Assignee: TELESOFT TECHNOLOGIES LTD., Blanford Forum, Dorset (GB)

( * ) Notice: Subject to any disclaimer, the term of this patent is extended or adjusted under 35 U.S.C. 154(b) by 0 days.

(21) Appl. No.: 15/545,367

(22) PCT Filed: Jan. 26, 2016

(86) PCT No.: PCT/GB2016/050160
§ 371 (c)(1),
(2) Date: Jul. 21, 2017

(87) PCT Pub. No.: WO2016/120604
PCT Pub. Date: Aug. 4, 2016

(65) Prior Publication Data
US 2017/0373953 A1 Dec. 28, 2017

(30) Foreign Application Priority Data
Jan. 26, 2015 (GB) .................................. 1501276.8

(51) Int. Cl.
*H04L 12/26* (2006.01)
*H04L 29/12* (2006.01)
(Continued)

(52) U.S. Cl.
CPC .............. *H04L 43/04* (2013.01); *H04L 43/12* (2013.01); *H04L 61/2514* (2013.01);
(Continued)

(58) Field of Classification Search
CPC ...... H04L 43/04; H04L 61/2514; H04L 43/12
See application file for complete search history.

(56) References Cited

U.S. PATENT DOCUMENTS 9,929,933 B1 * 3/2018 Viljoen .................. H04L 45/02
10,057,167 B2 * 8/2018 Congdon ............ H04L 61/2557
(Continued)

FOREIGN PATENT DOCUMENTS

| EP | 2629482 | 8/2013 |
|---|---|---|
| GB | 2402845 | 12/2004 |

(Continued)

OTHER PUBLICATIONS

International Search Report and Written Opinion for PCT/GB2016/050150, dated Apr. 13, 2016 (13 pages).
(Continued)

*Primary Examiner* — Yemane Mesfin
*Assistant Examiner* — Henry Baron
(74) *Attorney, Agent, or Firm* — Conley Rose, P.C.

(57) ABSTRACT

A data retention probe for a packet-switched, mobile telecommunications network employs interfaces to connect to interfaces carrying traffic on a mobile network side of a gateway node and on a global internet side of the gateway node. A FPGA creates for each packet at least one fingerprint of one or more fields that are unchanged as part of the address translation performed by the gateway node and to create informative metadata for those packets. A processing unit: (1) receives from the FPGA the fingerprints and metadata and maintains flow records for each flow of packets seen on each side of the gateway node; and (2) compares the fingerprints and, where a match is found, determines those packets to be part of the same communication session and creates a record correlating internal IP address or a subscriber identifier to external IP address and port number.

20 Claims, 15 Drawing Sheets

(51) Int. Cl.
  *H04L 29/06* (2006.01)
  *H04W 80/06* (2009.01)
  *H04W 88/16* (2009.01)
  *H04W 12/02* (2009.01)

(52) U.S. Cl.
  CPC ........ *H04L 61/6054* (2013.01); *H04L 63/306* (2013.01); *H04L 63/308* (2013.01); *H04W 12/02* (2013.01); *H04L 61/6018* (2013.01); *H04L 69/22* (2013.01); *H04W 80/06* (2013.01); *H04W 88/16* (2013.01)

(56) References Cited

U.S. PATENT DOCUMENTS

| | | | |
|---|---|---|---|
| 2010/0189004 A1 | 7/2010 | Mirandette et al. | |
| 2011/0191467 A1* | 8/2011 | Imbimbo | H04L 29/12433 709/224 |
| 2012/0170470 A1 | 7/2012 | Duchenay et al. | |
| 2014/0280825 A1 | 9/2014 | Agrawal et al. | |
| 2017/0134538 A1* | 5/2017 | Mahkonen | H04L 12/4633 |

FOREIGN PATENT DOCUMENTS

| | | |
|---|---|---|
| GB | 2487818 | 8/2012 |
| GB | 2505288 | 2/2014 |
| WO | 02/085041 | 10/2002 |
| WO | 2010/019084 | 2/2010 |
| WO | 2011032256 | 3/2011 |
| WO | 2014/001773 | 1/2014 |
| WO | 2015024838 | 2/2015 |

OTHER PUBLICATIONS

Solution Description for Retained Data Large Scale, Sophia Antipolis, France, Jan. 14-16, 2013, European Telecommunications Standards Institute, vol. LI, 14 (16 pages).

Partial Search Report for GB1501276.8 dated Jul. 22, 2015 (5 pages).

PCT Published Application and Search Report for PCT/GB2016/050160 published Aug. 4, 2016 (60 pages).

* cited by examiner

Figure 7
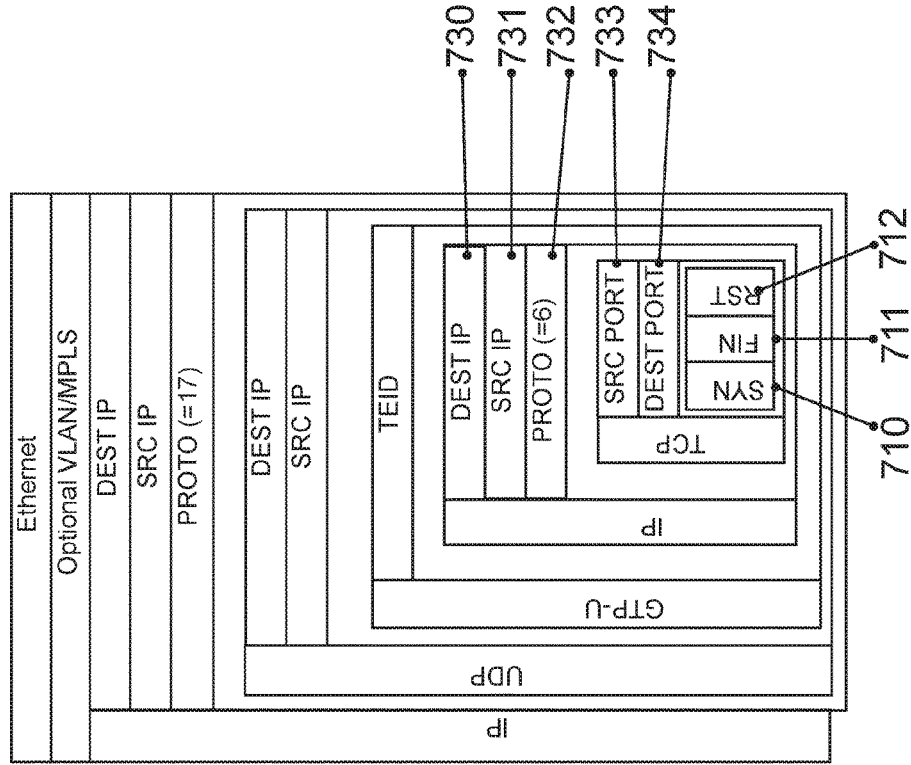
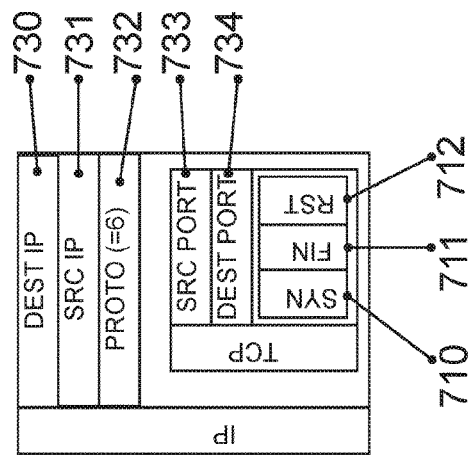

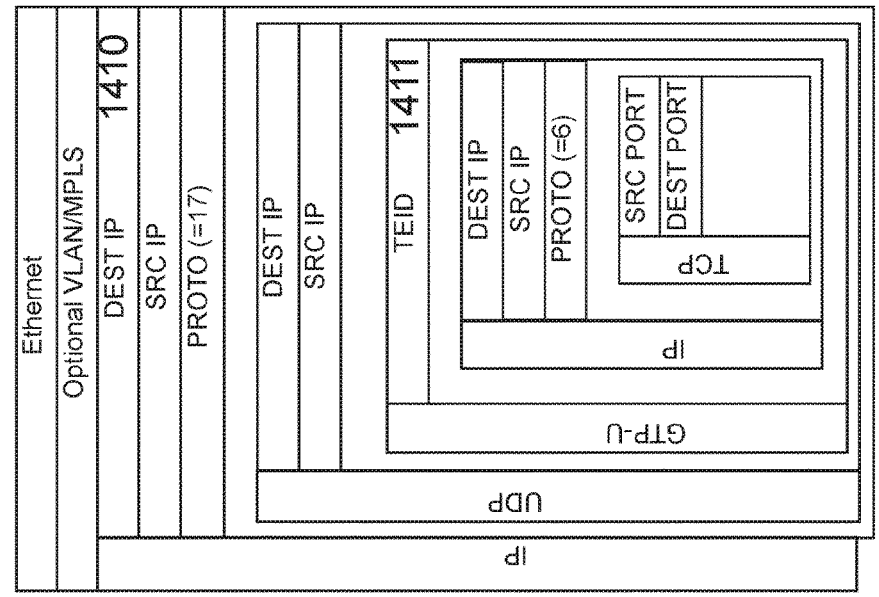
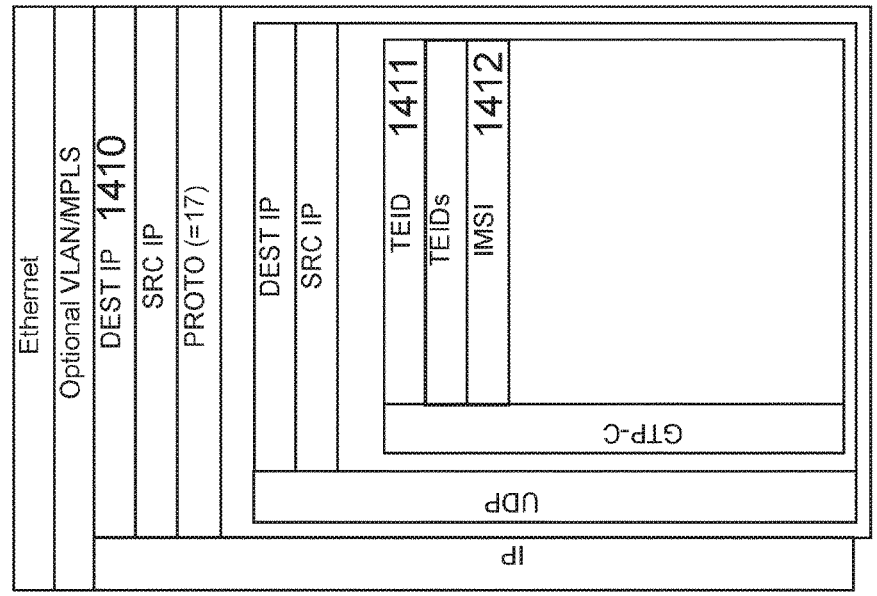
Figure 14

DATA RETENTION PROBES AND RELATED METHODS

CROSS REFERENCE TO RELATED APPLICATIONS

This application is the U.S. National Stage entry under 35 U.S.C. § 371 of International Patent Application No. PCT/GB2016/050160, filed Jan. 26, 2016, and entitled "Data Retention Probes and Related Methods," and GB Application No. 1501276.8 filed Jan. 26, 2015 and entitled "Data Retention Probes and Related Methods," both of which are incorporated by reference herein in their entireties for all purposes.

TECHNOLOGICAL FIELD

The present disclosure relates to data retention probes and related methods having particular utility for a packet-switched, mobile telecommunications network.

BACKGROUND

Lawful interception (LI) is obtaining telecoms network data pursuant to lawful authority for the purpose of analysis or evidence. Such data generally can consist of signalling or network management information or sometimes the content of the communications.

There are many bases for this activity that include infrastructure protection and cybersecurity. In general, the operator of public network infrastructure can undertake LI activities for those purposes. Operators of private network infrastructures have the right to maintain LI capabilities within their own networks unless otherwise prohibited.

Another base for LI is the interception of telecoms by law enforcement agencies (LEAs), regulatory or administrative agencies, and intelligence services, in accordance with local law. Under some legal systems, implementations may require receiving proper authorization from competent authorities (e.g. see UK Government's Regulation of Investigatory Powers Act (RIPA)). This legislation covers warrant based Lawful Intercept of both (i) call, session and message data records (Data Retention) and (ii) content.

The UK Communication Service Providers (CSPs) were not historically compelled by law to retain data. CSPs would keep billing records of all phone calls for their own business reasons. The UK Security and Intelligence Agencies (SIAs) and other authorised bodies would access this retained data within the confines of the RIPA framework. This method of intelligence gathering is used primarily by the security services to build a picture of target networks and to rule out innocent parties.

Today communication methods are complex, a number of different access methods exist to reach the internet and once accessed the ubiquitous IP/TCP transport makes the use of many different services possible.

The majority of CSPs routinely bill based on data usage but have no visibility of the communication sessions being carried on top of that data meaning that for many communication sessions useful records are not generated.

The terrorist attacks of 9/11 and 7/7 prompted legislation in the US and Europe to force the CSPs to retain Communications Data (CD) for up to 12 months. It is important to note the differentiation between CD and Communications Content (CC). CD is metadata about the communication like the parties involved, time and date of the communication but does not include any of the actual communication itself (e.g. text, web pages, voice etc.). CC however, is the actual intercepted communication content and interception can only be initiated with a warrant from the home office for a targeted individual.

The EU Data Retention Directive 2006 initiated the UK Data Retention Directive 2009 (the US law is called the Anti-terrorism, Crime and Security Act 2001 (ATCSA)). The EU Data Retention Directive has since been declared invalid by the European Court of Human Rights as contravening an individual's right to privacy. However the UK Government continues to enforce the UK Data Retention Directive believing it is critical to national security and crime prevention.

Despite the 2009 directive, UK Government and CSPs concede that there is a capability gap in the current data retention systems. The UK Government is seeking to introduce more powers under what's referred to as the "Draft Communications Bill". The Draft Communications Bill focuses on addressing this capability gap in three areas:
  1. The Attribution of IP address to an individual.
  2. Identifying the internet services or websites being accessed (social media).
  3. Data from overseas CSPs.

The details of and acceptability of this bill are still being discussed

Prior art solutions monitors interfaces on the internet side of the network. A problem arises with this technique because of the NAT (Network Address Translation) that occurs when, where for Mobile Operators there is not a one to one correlation of subscribers (who could use the web at any one time) and the number of IP address they have available to them under IPv4. This means that it is often not possible to uniquely identify the user of the web session, rendering the collected information useless.

The IP protocol is a 'network' level protocol and is absolutely fundamental to how the internet works. It uses a source and destination IP address to route traffic from one node to another across a network of interconnected routers i.e. "the internet". The IP protocol is used to route all traffic across the internet. Today the IPv4 version of the protocol is used for 95% of all traffic. Although a newer version of the IP protocol is available (IPv6) with far more unique addresses, its uptake requires a very costly update of network infrastructure for anyone wishing to use it, and hence has not been widely adopted.

IPv4 addresses were originally a reliable indication of end point identity, what that means is that typically only one piece of terminating equipment would be using a unique IP address at any one time and that IP address would only be changed infrequently.

However, more recently, with only 4.2 billion IPv4 addresses available for all IP communications globally, the pool of free addresses is beginning to run out. Many CSPs have already exhausted their quota of IPv4 addresses. As a result of IPv4 address exhaustion CSPs and others who allocate IP addresses are implementing methods of sharing addresses between multiple nodes.

Methods of optimising IPv4 address usage such as dynamic IP address allocation and Network Address Translation (NAT) extend the use of IPv4 addresses, but break the one to one static allocation of a unique address to an individual. This high volume, highly optimised and rapidly churning NAT within the carrier network is termed Carrier Grade NAT (GCNAT) and is now used in almost all mobile networks and increasingly in fixed line broadband networks. This causes a serious problem for any authorised organisation as any retained CD seen within the internet is not readily nor reliably attributable to a single identity.

An additional problem is the high data speeds in the network make real-time manipulation of data highly challenging. Comparative technology generally operates with software based solutions where higher speeds are attained by simply increasing the power and number of processing units. Such solutions are unsatisfactory owing to cost, difficulty in designing the architecture and difficulty in scaling the architecture to higher throughput or type of traffic. Such systems struggle to cope with the very high throughput demanded in modern applications, which is only expected to increase in the future. Such systems typically have to be finely tuned to the application causing delays and overheads in product development.

What is needed is a network probe that addresses some or all of these problems.

BRIEF SUMMARY OF THE DISCLOSURE

According to a first aspect of the present disclosure, there is provided a data retention probe for a packet-switched, mobile telecommunications network, the mobile network being arranged to forward packets between subscriber units and a gateway node, wherein the gateway node translates internal IP addresses used within the mobile network to global IP addresses and port numbers used outside the mobile network in the global internet, the probe comprising:

a first interface arranged to connect to an interface carrying traffic on the mobile network side of the gateway node;

a second interface arranged to connect to an interface carrying traffic on the global internet side of the gateway node;

a FPGA arranged to process packets on the mobile network seen via first the first interface and on the global internet side seen via the second interface to create for each packet at least one fingerprint of one or more fields in the packets that are unchanged as part of the address translation performed by the gateway node and to create metadata for those packets comprising addressing information for those packets;

a processing unit in communication with the FPGA arranged to receive from the FPGA the fingerprints and metadata and to maintain flow records for each flow of packets seen on each side of the gateway node, the processing unit being further arranged to compare the fingerprints of said packets in the flow records for the mobile network and global internet respectively and, where a match is found, to determine those packets to be part of the same communication session, and, where packets are determined to be part of the same communication session, create a record correlating internal IP address or a subscriber identifier within the mobile network to external IP address and port number for those packets.

The probe operates by monitoring interfaces before and after NAT, i.e. on the network side and on the sub-network side of the gateway node. Information is extracted from the data flows before NAT inside the mobile network and from the data flows after NAT outside the mobile network. Correlation of extracted information allows sessions to be matched to each other and hence internal and external IP address values to be matched to each other. The probe uses an FPGA to extract metadata from the packets and create certain hash values. These are passed to one or more processing units for further analysis in matching flows. Thus, the FPGAs speed in certain subtasks is employed to relieve the processing unit of much of the overhead in examining and processing packets and is only presented with information it needs to perform the correlation function. The FPGA can pass data directly to the processor unit or to memory associated with the processor unit by using DMA. This helps reduce load on the processing unit, the memory associated with the processing unit and the bus between the FPGA and processing unit. The processing unit executes software that looks for matches between the flow records on either side of the NAT function that indicates that the packets belong to the same flow. The processing unit creates correlation records for matching flows based on the metadata stored in the matching flow records, indicating the address fields altered by the NAT function.

In an embodiment, the FPGA is arranged to filter TCP session control events and passes these events to the processing unit, and wherein the processing unit is arranged to maintain stateful flow records for packets seen on both sides of the gateway node.

The FPGA relieves the processing unit of the burden of processing and identifying session control packets, and passes a session event, such as the start or end of a session indicated by TCP SYN and TCP RST/FIN respectively, to allow the processing unit to maintain a real time record of what flows are active in the networks as seen on the probe's interfaces.

In an embodiment, the FPGA is arranged to create a fingerprint for the application data portions of said packets and passes the fingerprints to the processing unit which is arranged to store the fingerprint in the flow record for that flow and to compare the fingerprints in flow records for packets seen on each side of the gateway node to identify a match.

The fingerprint, i.e. hash, of the application payload in a packet is invariant across the NAT function and therefore is an indicator that the packets belong to the same flow. Using a hash value improves the time taken to compare payloads compared with comparing the actual bit values, and the act of calculating the payload by the FPGA relieves the processing unit of the burden of calculating the hash itself. This also means that the payload itself does not need to be passed to the CPU, thereby reducing the traffic on the system bus between the FPGA and processing unit and avoiding potential bottlenecks.

In an embodiment, the FPGA calculates a hash value on the addressing information in the packets which creates a non-unique index for accessing flow records. This provides a rapid index into the flow records for the host software to maintain the flow records, e.g. update, delete, etc. In an embodiment, the metadata includes information uniquely identifying the flow which can be stored in the flow record and used with the index hash value to uniquely select the flow record when maintaining the flow records.

In an embodiment, the FPGA is arranged to calculate a hash value on the 5-tuple of addressing information in the packets and wherein the processing unit is arranged to maintain flow records for packets seen on each side of the gateway node indexed by the 5-tuple hash. The 5-tuple hash value is also calculated by the FPGA to relieve the processing unit of this overhead, and used to create an index into the flow records. Because of the large number of possible flows, the hash value is not necessarily unique to a particular flow. Thus, multiple flow records can exist for a particular 5-tuple hash value, in which case further identifying information is used to access the correct record when the record is updated with new flow information, e.g. payload hashes, or end of session teardown. Metadata relating to more than one session can therefore be indexed by a particular hash. The hash provides an even distribution of flows among the available hash values, which promotes rapid indexing and efficient processing of the flow records.

In an embodiment, the metadata includes the 5-tuple of addressing information in packets, wherein the processing unit is arranged to maintain flow records for packets seen on each side of the gateway node indexed by a non-unique 5-tuple hash and using the 5-tuple addressing information values to uniquely identify a flow record for that flow. Thus, the 5-tuple hash is used as a rapid initial index into the flow records, and the metadata is used to identify the particular flow record within the set of potentially plural flow records indexed by a 5-tuple hash.

In an embodiment, the FPGA is arranged to calculate a hash value of destination addressing information in the packets which is also passed to the processing unit, and wherein the processing unit is arranged to maintain flow records for packets seen on each side of the gateway node indexed by the 5-tuple hash and the destination hash. This forms one rapid way of uniquely indexing the flow records whenever they are created, updated, or deleted. Using hash values is much quicker for the processing unit than trying to index flow records on the individual fields of the packets.

In an embodiment, the FPGA is arranged to also calculate a hash value of destination addressing information in the packets comprising destination port, destination IP address and protocol which is also passed to the processing unit, the processing unit being arranged to store the destination hash in the flow records and to compare the destination hash in flow records for packets seen on each side of the gateway node to identify a match.

The destination hash value is preferably computed on the destination port, destination IP address and protocol fields in the packets.

Because the fingerprint on the application payload is not guaranteed to be unique, a further match is preferably performed on the destination addressing information of the packets, which is also invariant across the NAT function. Again, the FPGA relieves the processing unit of the burden of calculating the destination address hash value, allowing the processing unit to concentrate on the matching function. This is particularly advantageous when the destination has value is used to index flow records as well as matching criteria.

In an embodiment, the fingerprints are grouped according to the destination hash in the flow records, such that, when identifying a match between the flow records seen on each side of the gateway node, the processing unit first identifies a match between the destination hashes, and then identifies a match between fingerprints associated with the matching destination hashes.

This means that fingerprint matching on the payload need not be performed across the board, but can be limited to fingerprints where the destination hash has already matched. This again reduces the overhead on the processing unit allowing higher speeds to be attained.

In an embodiment, the processing unit is arranged to determine packets to be part of the same communication session only when said packets with matching application data fingerprint and/or destination hash are seen on the mobile network and global internet respectively within a predetermined time period. As the NAT function is expected to be performed with very little latency, the time period can be made small, e.g. tenths of a second or less, to increase the confidence of the match and minimise the risk of false matches being made. The processing unit initiates a timer when a fingerprint is stored in the flow record associated with that packet, which may be stored in the flow record, which is checked when a potential match is found. If no matches are found within the time period, the fingerprint is discarded.

In an embodiment multiple packets are matched within the time period to determine the packets belong to the same flow.

In an embodiment, the probe comprises plural processing units each arranged to match a subset of flow records for one side of the gateway node with flow records on the other side of the gateway node, wherein the FPGA load balances between the plural processing units according to the 5-tuple hash value. The 5-tuple hash function has the additional benefit of evenly distribute flows across the available hash values which can be used to evenly distribute the flows to the processing units for processing.

In an embodiment, the FPGA is arranged to calculate a hash of the 5-tuple for fingerprinted data packets and to pass this hash to the processing unit, wherein, if a match has been found, the processing unit is arranged to use the received 5-tuple hash to look up in the respective flow records the details of fields that have been translated by the gateway node and to create an IP address resolution record with these details.

In an embodiment, the FPGA is arranged to identify tunnel control packets on the mobile network and to calculate a hash of one or more fields in a tunnelled packet, the fields including at least the tunnel identifier, and to pass the hash to the processing unit together with metadata identifying the subscriber, the processing unit arranged to store a record of tunnels correlated to subscriber identifier indexed by said hash value, the FPGA being further arranged to calculate a hash of said fields in session control packets and/or user data packets seen on the mobile network and to pass the hashes to the processing unit, if a match is found, the processing unit is arranged to lookup the subscriber identifier in the record using the received hash value for that flow and to store the subscriber identifier in the flow record.

Thus, as well as matching the post-NAT address information to pre-NAT internal IP address information the probe can correlate to the subscriber identity in the mobile network which can be recorded as well as or alternatively to the internal IP address.

In embodiments, as well as matching fingerprints across the NAT function, metadata generated by the FPGA can also be stored in the flow records and used to match flows. For instance, the number of bytes in a packet or flow can be matched, or the number of packets seen within a specified time period can be matched.

According to a second aspect of the present disclosure, there is provided a method of carrying out data retention for a packet-switched, mobile telecommunications network, the mobile network being arranged to forward packets between subscriber units and a gateway node in tunnels, wherein the gateway node translates internal IP addresses used within the mobile network to global IP addresses and port numbers used outside the mobile network in the global internet, the method comprising:

comprising connecting to the mobile network side of the gateway node and connecting to the global internet side of the gateway node;

processing with a FPGA packets on the mobile network seen via first the first interface and on the global internet side seen via the second interface to create for each packet at least one fingerprint of one or more fields in the packets that are unchanged as part of the address translation performed by the gateway node and to maintain metadata for those packets comprising addressing information for those packets;

receiving at a processing unit from the FPGA the fingerprints and metadata and creating flow records with the processing unit for each flow of packets seen on each side of the gateway node;

comparing with the processing unit the fingerprints of said packets in the flow records for the mobile network and global internet respectively and, where a match is found, determining those packets to be part of the same communication session; and, where packets are determined to be part of the same communication session, creating a record correlating internal IP address or a subscriber identifier within the mobile network to external IP address and port number for those packets.

The probe operates by monitoring interfaces before and after NAT. Information is extracted from the data flows before NAT inside the mobile network and from the data flows after NAT outside the mobile network. Correlation of extracted information allows sessions to be matched to each other and hence internal and external IP address values to be matched to each other. In preferred embodiments, the probe also extracts information from the mobile network message flows to match a mobile network subscriber identity such as International Mobile Subscriber Identity (IMSI) to pre-NAT IP address. It follows on that the MSISDN or other subscriber identity can then be matched to an external post NAT IP address.

According to another aspect of the present disclosure, there is provided a data retention probe for a packet-switched, mobile telecommunications network, the mobile network being arranged to forward packets between subscriber units and a gateway node in tunnels, wherein the gateway node maps IP addresses used within the mobile network to global IP addresses and port numbers used outside the mobile network in the global internet, the probe comprising:

an interface arranged to connect to one or more interfaces carrying traffic between nodes of a mobile network;

a processing unit arranged to examine packets on the mobile network seen via the interface, and to identify in those packets subscriber identities on the mobile network associated with particular tunnels, and to identify in those packets internet activity associated with particular tunnels; and, wherein the processing unit is further arranged to correlate subscriber identities with internet activity of interest by matching the associated tunnels and to create a record of said correlated subscriber identities and internet activity.

In preferred embodiments, the mobile network is a GSM/GPRS core network or UMTS core network or LTE Evolved Packet Core (EPC) network carrying tunnelled data attributable to individual users.

In an embodiment, the processing unit maintains a log of subscriber identities to tunnels on the mobile network. Thus, when subsequent packets are observed on the network relating to internet activity of interest, the tunnels in which those packets are contained can be checked against the log to find the subscriber identity for that tunnel.

In an embodiment, the log of subscriber identities associated with tunnels is stateful. In other words, the processing unit continues to monitor packets on the network to update the log when packets are identified that signify tunnels being created or destroyed. This helps prevent internet activity being misattributed to a particular subscriber.

In embodiments, the packet switched network is a GSM/GPRS core network or UMTS core network or LTE Evolved Packet Core (EPC) network and GTP-C packets carried on the S5, S8, Gn or Gp interface are examined to generate the log of subscriber identifies to tunnels. In embodiments, the packet switched network is a GSM/GPRS core network or UMTS core network or LTE Evolved Packet Core (EPC) network and IuPS, S1-MME or S1-U interface packets are examined to generate the log of subscriber identifies to tunnels. In embodiments, the probe monitors other interfaces within the mobile network that carry messaging that includes both internal pre-NAT IP address and subscriber identity such as MSISDN. An example of such messages is RADIUS. Information is extracted from these messages to allow the probe to match a subscriber identity to an internal pre-NAT IP address.

In an embodiment, for an instance of internet activity of interest associated with a particular tunnel, the processing unit looks up the corresponding subscriber identity associated with that tunnel in the log of subscriber identities to correlate subscriber identities with internet activity.

In an embodiment, the probe comprising a filtering unit arranged to filter the packets so that only packets relating to a predetermined set of internet activity events are passed from the interface to the processing unit. The filtering unit only allows through packets that are relevant for further processing to make the amount of data being processed more manageable given the data rates experienced on the network. For instance, typical events of interest might be a packet relating to a HTTP "/GET" request signifying the user is attempting to access a web page. The filtering unit may match a predetermined signature to the packet header to identify particular events. This may be applied in hardware, e.g. a FPGA, to deal with the high data rates experienced.

In an embodiment, the processing unit redacts the external internet IP address so that only the high level url of the IP address is included in the record. This selectively retains data in accordance with legislative rules. The data retained may comprise the visited web address up to the first "/" (for example http://America.aljazeera.com/articles/2014/7/10/uk-rushing-to-passlawtokeepuserdatastored.html is stored as http://america.aljazeera.com). This functionality may be implemented by hardware, e.g. a FPGA, which identifies the relevant field in the packet data and only passes the high level url for further processing. This means that the hardware is incapable of being used to create a "weblog" of user browser activity that contains the previously redacted parts of the user data.

In an embodiment, the packet switched network is a GSM/GPRS core network or UMTS core network or LTE Evolved Packet Core (EPC) network and the processing unit monitors GTP-U packets to identify internet activity associated with a tunnel.

In an embodiment, the processing unit calculates the length of time spent on a website and/or the number of pages visited on a website and includes this in the record. The length of a visit to a website can be derived for example by comparing the timestamp for the first URL with for example just "www.bbc.com/" with the timestamp of the last URL with the same address. Armed with this information, individuals can be ruled in or out quickly based on the duration of their visit to a particular site combined with the number of pages they visited on that site—i.e. to rule out individuals who mistakenly clicked on something and then clicked immediately off the site when they understood its true nature.

In an embodiment, a FPGA based deep packet inspection process is used to identify internet activity events types such as, but not limited to session start and session end.

In an embodiment, the probe comprises a processor in communication with the FPGA, wherein said further processing comprises the FPGA passing information to the processor allowing the processor to correlate subscriber identity with tunnel identity, the processor being arranged to configure a filter of the FPGA to filter data packets associated with those tunnels for further processing.

According to another aspect of the present disclosure, there is provided a data retention probe for a packet-switched, mobile telecommunications network, the mobile network being arranged to forward packets between subscriber units and a gateway node in tunnels, wherein the gateway node maps IP addresses used within the mobile network to global IP addresses and port numbers used outside the mobile network in the global internet, the probe comprising:

a first interface arranged to connect to an interface carrying traffic between nodes of a mobile network;

a second interface arranged to connect to an interface carrying traffic on the global internet side of the gateway node;

a processing unit arranged to examine packets on the mobile network seen via first the first interface, and to identify in those packets the subscriber identities on the mobile network associated with particular tunnels and to identify the application data portions of packets in those tunnels, the processing unit being further arranged to examine packets on the global internet side of the gateway node seen via the second interface, and to identify in those packets the application data portion and the external IP address and port number, the processing unit being further arranged to compare the application data portions of said packets seen on the mobile network and global internet respectively and, where a match is found, to determine those packets to be part of the same communication session, and, where packets are determined to be part of the same communication session, create a record correlating subscriber identify to external IP address and port number for those packets.

The probe solves the problem of attributing subscriber identities to external IP and port numbers used in the external network where the gateway node performs an address translation on packets between the two networks. The data probe recognises that the user data within a packet on the two legs of the communication, i.e. in the mobile network and in the external network, are unlikely to change during this process. Therefore, a probe is used that monitors both legs and matches the application data portions of the packets. The probe thus disregards over the header data in the packets in this process and is only concerned with the application data encapsulated within the packets. When a match is found this is indicative that the packets belong to the same communications session. Thus, a record can be kept attributing post-NAT IP addresses to pre-NAT subscriber identities including, but not limited to, pre-NAT IP address, IMSI, IMEI, MSISDN so that requests in the internet side of the network can be attributed to subscribers in the subscriber network. This technique can be used separately or in combination of any of the techniques described above.

In another aspect, there is provided a data probe for a packet-switched, mobile telecommunications network, the mobile network being arranged to forward packets between subscriber units and a gateway node in tunnels, wherein the gateway node maps IP addresses used within the mobile network to global IP addresses and port numbers used outside the mobile network in the global internet, the probe comprising:

an interface arranged to connect to one or more interfaces carrying traffic between nodes of a mobile network;

a FPGA arranged to examine packets on the mobile network seen via the interface, and to identify in those packets subscriber identities on the mobile network associated with particular tunnels;

a processor in communication with the FPGA arranged configure the FPGA to filter packets associated with internet activity for a particular tunnel and to forward information indicative of the filtered internet activity to the processor, the processor being arrange to correlate internet activity to particular users based on the information received from the FPGA.

This allows the probe to monitor traffic at high speeds in the network, e.g. in excess of 10 Gbps or even in excess of 100 Gbps, by the novel and advantageous division of functionality between a FPGA and a processor, e.g. a programmed processor of a host computer. The FPGA can perform filtering functions at high speed, which would take the processor much longer. The processor operates on the filtered packets or relevant information extracted from the filtered packets to identify activity of interest, and to create records or perform further processing on the packets. The processing unit also feeds back information to the FPGA by configuring it to filter packets associated a tunnel of interest. This helps prevent the processor being overloaded with information and thus operable at high speeds. In preferred embodiments, different filtering operations and signature creation can be carried out by the FPGA as described in the detailed description. In some embodiments, the FPGA may implement a packet delay to allow the processor to configure the FPGA.

It will be appreciated that any features expressed herein as being provided "in one example" or "in an embodiment" or as being "preferable" may be provided in combination with any one or more other such features together with any one or more of the aspects of the present disclosure.

BRIEF DESCRIPTION OF THE DRAWINGS

Embodiments of the present disclosure will now be described by way of example with reference to the accompanying drawings, in which:

FIG. 7 shows examples of message packet formats for session control or to indicate significant events;

FIG. 14 shows examples of message packet formats carrying internal network subscriber identity and pre-NAT IP address; and, FIG. 15 shows an example of how data output from the FPGA is used to match different subscriber identities together.

DETAILED DESCRIPTION OF THE DISCLOSED EXEMPLARY EMBODIMENTS

Figure 1:
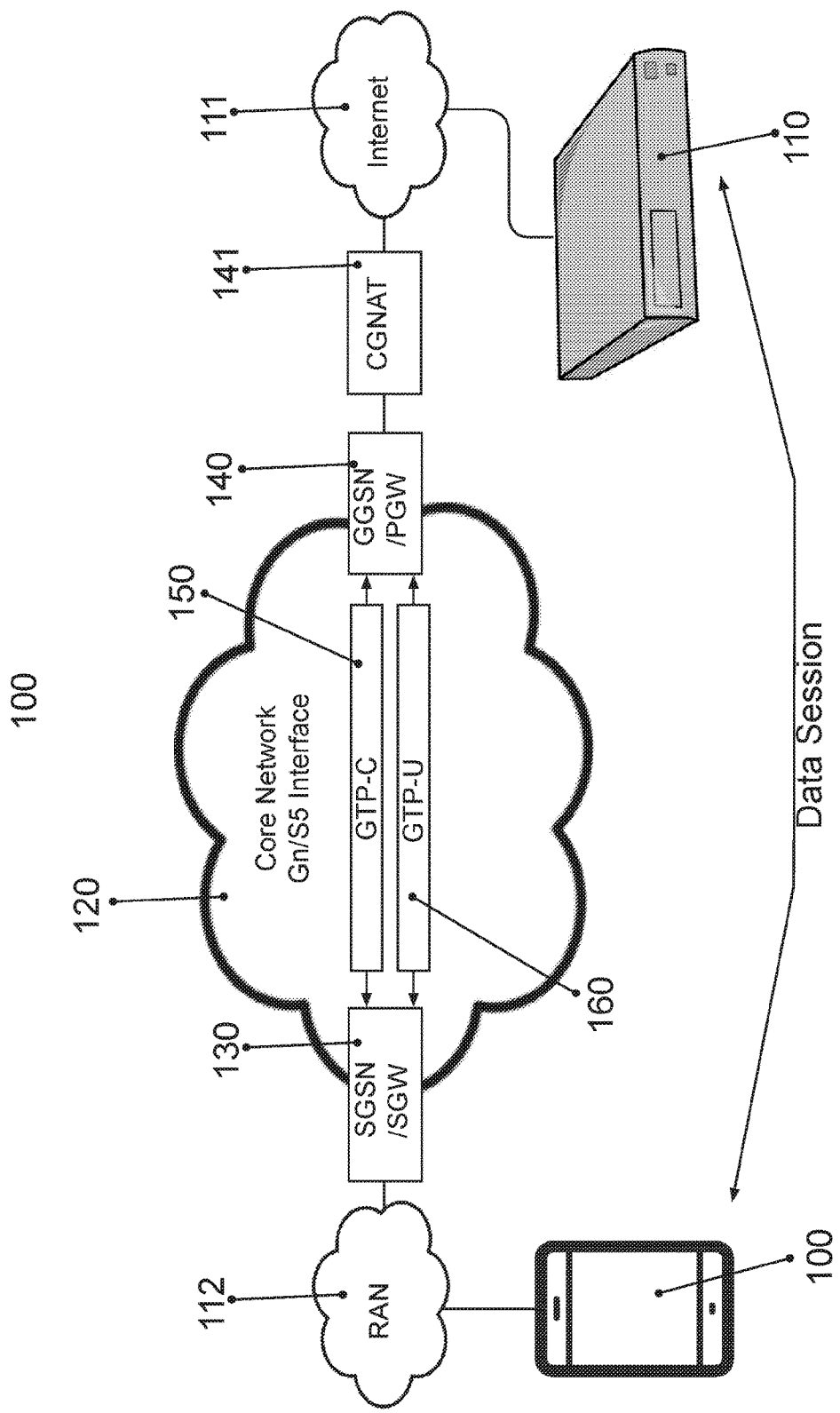
FIG. 1 shows part of a mobile a telecommunications network.

The following abbreviations are used in this document
CC—Communications Contents
CD—Communications Data
CGNAT—Carrier Grade Network Address Translation
CN—Core Network
CSP—Communication Service Providers
GGSN—Gateway GPRS support node
GPRS—GSM Packet Radio Service
GSM—Global System for Mobile
GTP—GPRS Tunnelling Protocol
GTP-C—GTP Control (Protocol)
GTP-U—GTP User (Protocol)
IMSI—International Mobile Subscriber Identity
IPAR—IP Attribution Record
LTE—Long Term Evolution
PGW—Public data network Gateway
RAN—Radio Access Network
RNC—Radio Network Controller
S1AP—S1 Application Protocol
S1-MME—S1 Mobility Management Entity
SCTP—Stream Control Transmission Protocol
SIA—Security and Intelligence Agencies
SGSN—Serving GPRS Support Node
SGW—Serving Gateway
TEID—Tunnel Endpoint Identifier field
UE—User Equipment
UMTS—Universal Mobile Telecommunications System FIG. 1 shows a network 100 for communications between a mobile subscriber unit 100, e.g. a mobile phone, and a webserver 110 attached to the global internet 111. A packet switched, mobile core network (CN) 120 carries user packet data between the Radio Access Network 112 and the internet 111.

The mobile core network 120 provides mobility management, session management and transport for Internet Protocol packet services in GSM, GPRS, UMTS and LTE networks. GTP (GPRS Tunnelling Protocol) is the defining IP-based protocol of the GPRS core network. Primarily it is the protocol which allows end users of a GSM, GPRS, UMTS or LTE network to move from place to place while continuing to connect to the Internet as if from one location at the Gateway GPRS support node (GGSN) or Public data network Gateway (PGW). It does this by carrying the subscriber's data from the subscriber's current serving GPRS support node (SGSN) or Serving Gateway (SGW) 130 to the GGSN or PGW 140 which is handling the subscriber's data session.

The GGSN/PGW 140 is responsible for the internetworking between the mobile core network 120 and external packet switched networks, i.e. the Internet 111. A SGSN or SGW is responsible for the delivery of data packets from and to the mobile stations within its geographical service area.

From an external network's point of view, the GGSN/PGW 140 is a router to a "sub-network", because the GGSN/PGW 'hides' the mobile network infrastructure from the external network. When the GGSN/PGW receives data addressed to a specific user from the external network, it checks if the user is active. If it is, the GGSN 140 forwards the data to the SGSN/SGW 130 serving the mobile user 100, but if the mobile user is inactive, the data is discarded. On the other hand, packets originating from the mobile user 100 are routed to the right network by the GGSN/PGW 140.

The GTP Protocol creates tunnels 150,160 within the mobile CN 120 network for communicating subscriber user data from the RAN 112 to the Internet 111. The link between the SGSN/SGW and the GGSN/PGW is called the Gn interface for GPRS/UMTS (2G/3G) and the S5 interface for LTE (4G).

The mobile subscriber user data is carried from the RAN 112 to the Internet Network 111 over the Gn and S5 interfaces in a GTP tunnel. GTP has two sub-protocols, the GTP-C protocol and GTP-U protocol. The GTP-C protocol 150 sets up and controls the GTP-U tunnels 160. The GTP-C also contains subscriber identity and location information. All subscriber data is encapsulated within these GTP-U tunnels 160 and is therefore associated explicitly with a subscriber identity e.g. an IMSI.

At the boundary between the Core Network 120 and Internet Network 111 the GGSN/PGW router 140 de-tunnels the subscriber user data from the GTP-U tunnel 160 and routes it out onto the public internet 111. Either as part of the GGSN/PGW 140 or as a separate entity a Carrier Grade Network Address Translation (CGNAT) function 141 assigns a non-unique IP address to the user data session for communication across the Internet Network 111. Both of these functions make producing reliable CD within the Internet Network 111 very challenging.

Figure 2:
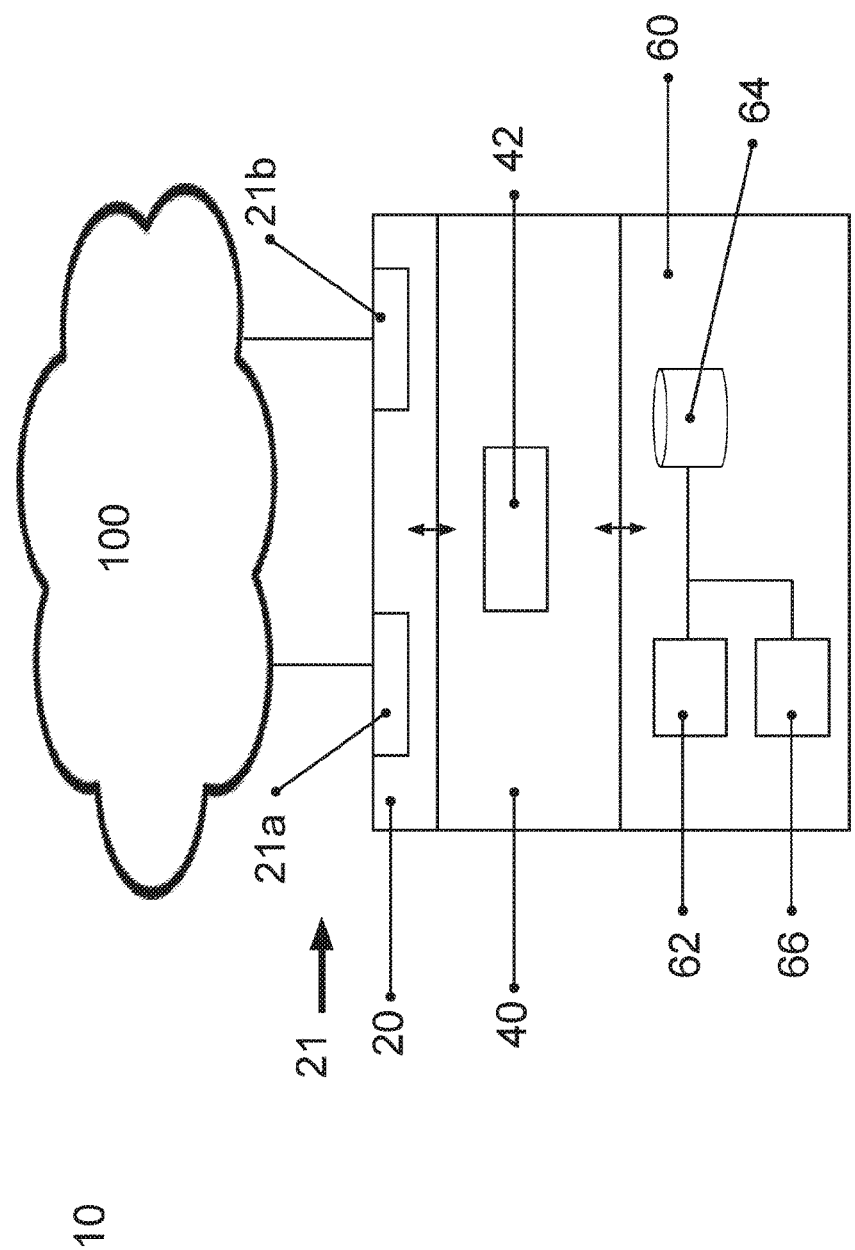
FIG. 2 shows a data retention probe in accordance with an embodiment of the present disclosure.

FIG. 2 shows schematically an example of a data retention probe 10. The probe 10 comprises an interface 20 for connecting to the network 100, which may comprise one or more sub interfaces or ports 21 for making separate connections to separate interfaces of the network 100. A filter unit 40 receives packets over the interface 20 and selects specific packets or information extracted from those packets for further processing according to predetermined criteria. The filter unit 40 may comprise a Field Programmable Gate Array (FPGA) 42 or other hardware means to help manage the high data rates experienced over the interface 20. A processing unit 60 receives filtered packets or information extracted from the filtered packets for further processing. The processing unit 60 may comprise a processor 62, storage 64 and RAM 66. Alternatively or additionally, as described below, a FPGA 42 can be used to perform some of the processing. In some embodiments, a single FPGA 42 can be used to perform filtering of packets and subsequent processing. In some examples, the processing unit 60 will be provided in a host computer running host software and the FPGA 42 will be provided in a daughter card which connects to a suitable interface of the host computer. In some examples, the storage 64 can be remote to the probe 10 and the probe can be provided with an interface to transmit data to the remote storage.

Figure 3:
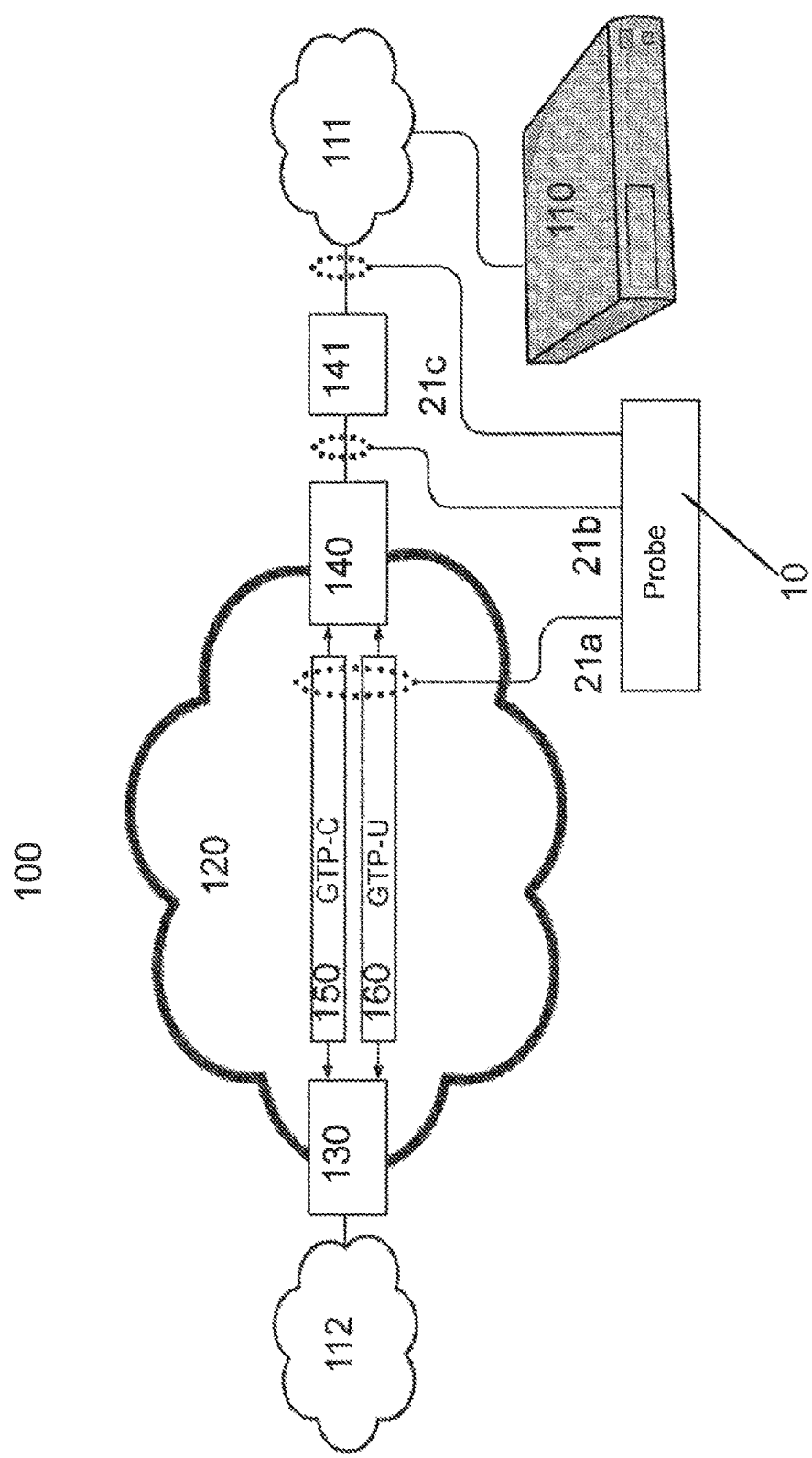
FIG. 3 shows the data retention probe of FIG. 2 monitoring a network.

At least one interface 21 of the probe 10 is arranged to monitor packet traffic before (that is to the left on FIG. 3) the CGNAT function 141 shown on FIG. 3. At least one interface 21 of the probe 10 is arranged to monitor packet traffic after (that is to the right on FIG. 3) the CGNAT function 141 shown on FIG. 3.

FIG. 3 shows the probe 10 connected to monitor traffic on the network 100.

The probe 10 monitors traffic before the CGNAT function 141 at a first interface 21a before the GGSN/PGW function or a second interface 21b after the GGSN/PGW function. The probe also monitors traffic after the CGNAT function 141 at a third interface 21c. Using information derived from traffic before and after the CGNAT function 141, the probe attempts to match sessions together across the CGNAT function.

If the probe 10 monitors around the NAT function 141 at 21b and 21c, the matches will allow pre and post CGNAT IP addresses to be matched. If the probe 10 is able to monitor elsewhere in the core mobile network, for example interface 21a, the probe may be able to associate the pre-CGNAT IP address with a mobile subscriber identity, for example IMSI, in addition.

Figure 4:
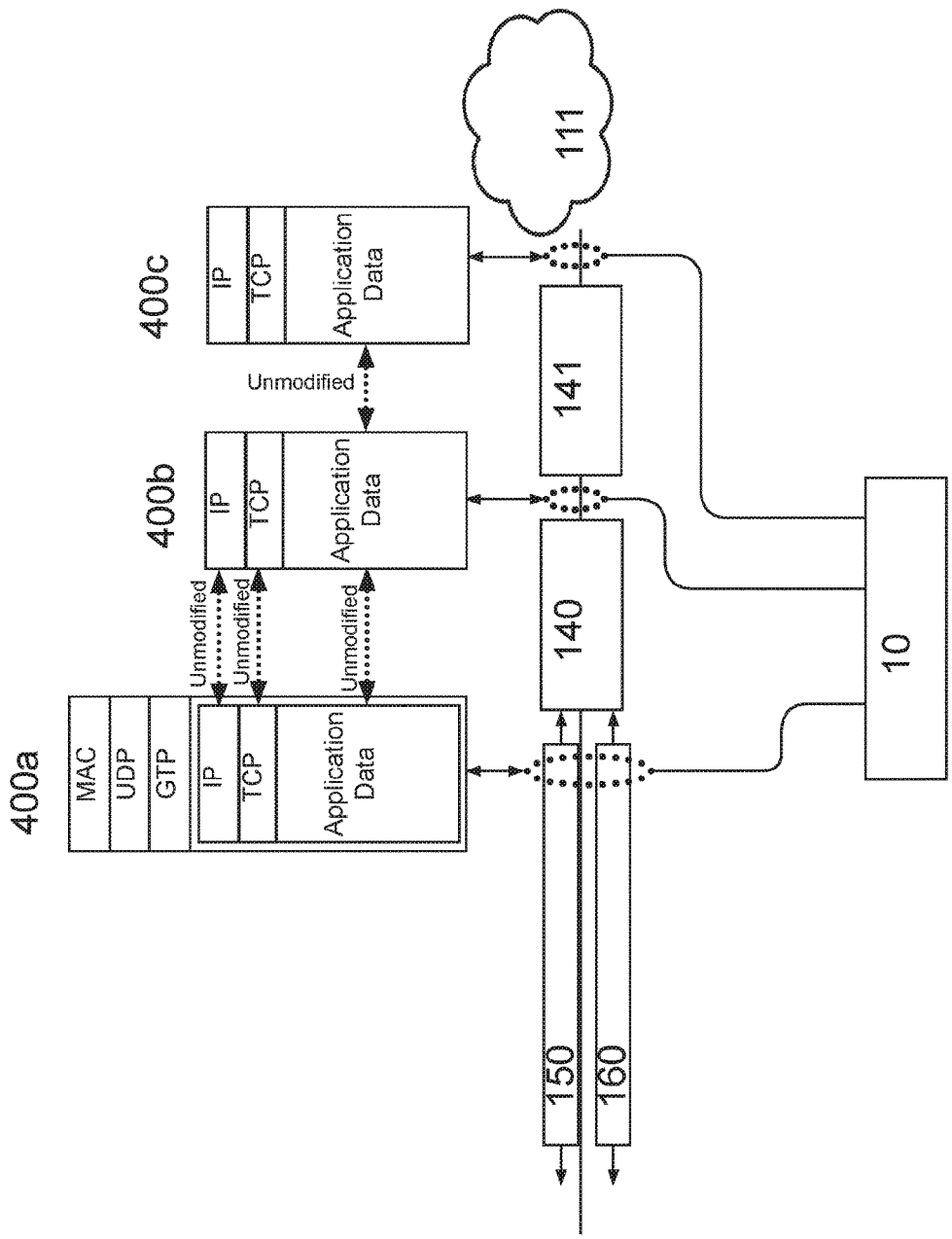
FIG. 4 shows examples of the data formats across the network of FIG. 3.

FIG. 4 provides more detail of how the data retention probe 10 can be deployed. In this scenario the probe produces correlation records that enable either mobile subscriber identity (IMSI) and/or internal mobile network CGNAT IP address to be matched to an external CGNAT produced IP address. This is equivalent to the IP and TCP port mapping details generated by the CGNAT function within the GGSN/PGW.

When a user data packet is transited by the GGSN 140 and CGNAT function 141 from the core network 120 into the internet network 111 three significant things happen:

1. The inner IP/TCP headers and their user data contents e.g. HTTP are extracted from the GTP-U header and its encapsulating Ethernet/IP/UDP header. i.e. the session is de-tunnelled.

2. The inner originating IP address previously allocated to the mobile UE 100 from a CSP pool of private IP addresses needs to be converted to a globally routable IP address that the CSP owns. This has to be done to allow the communication session to route outside of the CSP private network 120 e.g. into the internet 111. This is the CGNAT function 141

3. The user/application data is unmodified.

Because the CGNAT function 141 maps a large number of subscribers to a smaller number of external globally routable IP addresses, it has to find a way to share the IP address with many subscribers. It does this by adding a port number as a unique identifier. In certain types of CGNAT even the ports are shared if the destination IP address is unique. Thus, without knowing the temporary mapping generated and stored by the CGNAT function the there is no explicit tie between the two legs apart from the destination IP address.

The probe 10 produces a fingerprint of that user data on both sides of the CGNAT 141 and use that as a unique identifier within a certain timeframe. This recognises that the application data remains unchanged. Because the propagation delay of the CGNAT is likely to be very low this timeframe can be very low.

Figure 5:
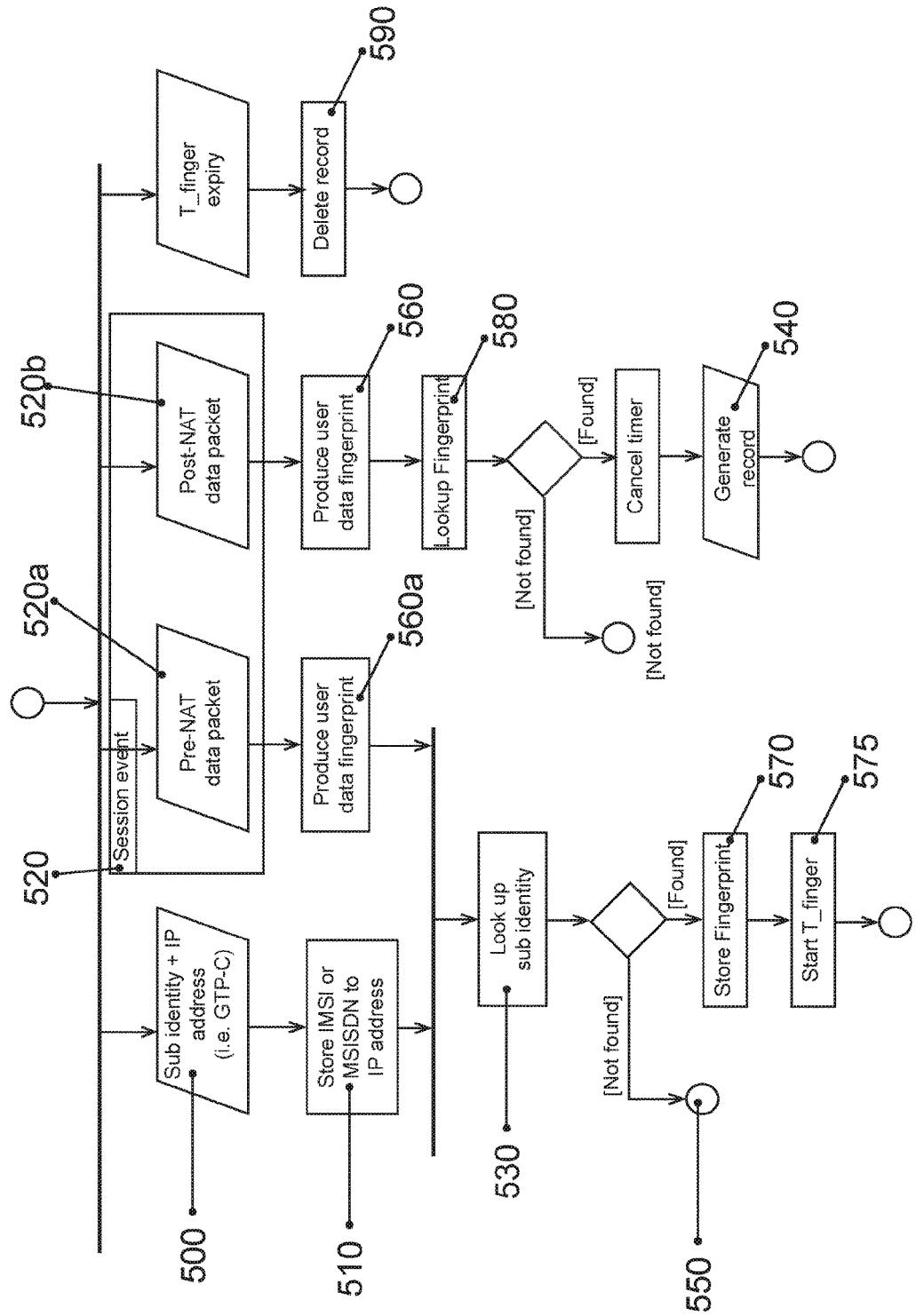
FIG. 5 shows the data flows in a data retention probe of FIG. 4.

FIG. 5 describes the processing sequence in detail. In steps 500 to 530 the probe correlates events of interest with subscriber. The FPGA filter 40 monitors packets on the core network-120 side of the CGNAT node 141 at interfaces 21a or 21b and on the internet-111 side of the CGNAT 141 node on interface 21c for an event of interest, e.g. a GET event signifying the user is accessing a webpage. For any packet containing an event of interest, the FPGA filter unit 40 will present (steps 520a, 520b) the packets for fingerprinting (steps 560a, 560b). In this step, the FPGA 42 will fingerprint the user data within the packets by producing for example a 32 bit CRC checksum of the data. Other checksum calculating methods and or sizes may be used. Thus, the FPGA 42 skips over the header fields (and GTP tunnel for packets from the core network) from the packets (shown by items 400a, 400b in FIG. 4) to access just the application data (also known as user data or the packet payload), which should be unchanged where the packets relate to the same communication session. Thus, in this case, the CRC signature generated on a packet 400a from interface 21a, the CRC signature generated on a packet 400b from interface 21b and the CRC signature generated on a packet 400c from interface 21c will all be identical.

The fingerprint 560a generated on the core network packet 400a is temporarily stored at step 570 and a timer started at step 575. The fingerprint 560b generated on the internet packet 400b is compared against the stored fingerprints 560a searching for a match (step 580). If a match is found, the timer value is compared with a predetermined threshold value to see if the matching packets were observed within a particular time period. If the packets were seen within a particular time period, they are taken to relate to the same communications session, and a record (step 540) is generated correlating the externally routable CGNAT produced IP address to the subscriber identity. If a match is found outside the predetermined time period, the record is deleted (step 590).

These fingerprint comparisons are optionally not carried out on every packet, only on packets that are significant for CD data retention, as described below. The FPGA filter may detect by signature matching relevant packets, e.g. those initiating web browsing, and pass only these packets to the processing unit.

Figure 6:
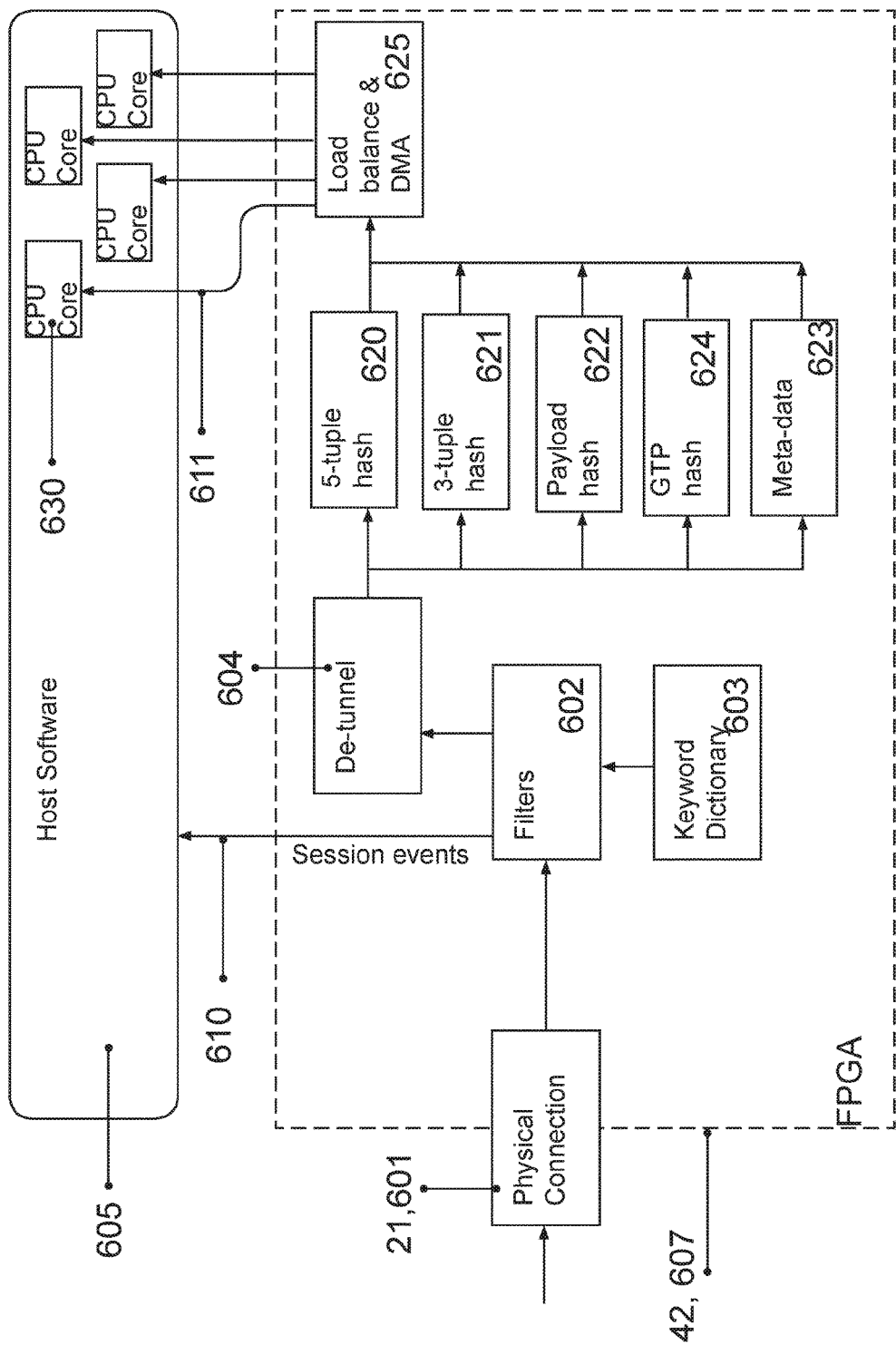
FIG. 6 shows an example of the functionality of a FPGA within a data probe according to embodiments of the disclosure.

FIG. 6 shows an example of an arrangement of functional blocks implemented in FPGA 42 in a probe 10. This shows in more detail how the FPGA 42 of FIG. 2 can be arranged to advantageously provide accelerated detection and matching of data sessions before and after GCNAT. The bounds of the functionality implemented in the FPGA are shown by the dashed line 607.

In this arrangement, IP traffic consisting of data packets is connected to the system through a physical interface 601 (interface 21 in FIG. 2). These packets are routed to filter 602. This filter 602 is programmed to search for specific keywords and signatures that can identify control protocols such as GTP-C and data packets that indicate the start and end of a user data session, for example TCP SYN or TCP FIN.

The keywords and patterns used to match packets against protocols are stored within the FPGA 42 for rapid access and fast programming. The FPGA 42 scans through each packet received looking for the keywords and signatures at any position. Searching for fixed patterns and keywords at variable positions is very processor intensive if implemented in software only. In this way the FPGA 42 is able to significantly speed up the detection and extraction of control protocols such as GTP-C. Any packets that potentially contain a control protocol such as GTP-C are passed to the Host Software 605 outside the FPGA for further processing (signified by arrow 610).

All packets received on interface 601 are subject to the following processing by the FPGA:

(1) a de-tunnel block 604, so that any encapsulating tunnel headers (such as GTP-U or MPLS or VLAN) are removed. Data is added to each packet relating to the tunnel identity to allow for rapid association of individual packets to an identifiable tunnel. Removing the tunnel header simplifies processing for the following blocks, whilst allowing quick access to the fields of interest in the tunnel header e.g. for calculating hashes or passing data to the processing unit.

(2) a 5-tuple hash block 620. This provides an index number allowing rapid access by the host software 605 to a memory record containing information about other packets in the same flow or user data session.

(3) a 3-tuple hash block 621. This provides an index number value that is based on packet data header fields that are not changed by the CGNAT function. This index value is calculated for packets monitored on both sides of the CGNAT function and provides one of the keys used by the host software 605 to match sessions across the CGNAT function.

(4) a Payload hash block 622. This provides an index number value that is based on the payload field of the packet data. This index value is calculated for packets monitored on both sides of the CGNAT function and provides one of the keys used by the host software 605 to match sessions across the CGNAT function.

(5) a GTP hash block 624. Where the packet is a tunnelled GTP packet, this provides an index number value that is based on the GTP header fields and provides one of the keys used by the host software 605 to match sessions with subscriber identifiers.

(6) a Meta-data block 623. This extracts information used by the matching algorithms in the host software 605 and also for the generation of IP Attribution records (IPAR).

(7) a Load balance and DMA block 625. This load balances flow information across Direct Memory Access (DMA) channels and processing entity such as a CPU core 630 running a thread of execution of the Host Software 605 or a memory location that serves a specific processing entity. Use of DMA by the FPGA provides a performance increase, as the data provided by the FPGA is written once only into the memory of the Host Software by the FPGA, rather than being copied from the FPGA memory into the host memory by the Host Software. The Host Software is alerted to the new flow information, so it can update its indexes.

Information is load balanced across interfaces 611 so that information for packets in the same session is delivered to the same processing entity. The 5-tuple hash value can be used to allocate a subset of flows on each side of the gateway node to each processing unit, e.g. different ranges of hash values being allocated to different processors. Due to the fact that the hash function evenly distributes flows among the available hash values, this provides is an efficient way of evenly providing load balancing with minimum overhead. For instance, the two most significant bits of the hash value can be checked and used to allocate the flows to four processing units, etc. Provision of DMA by the FPGA ensures better performance, as no time is wasted re-copying data sent to a processing entity that is not processing that session, and is thus the preferred way of passing data from the FPGA to the processing unit, although in other embodiments the data may be passed directly to the processing unit to be copied by the processing unit itself to memory if desired. The load balancing ability 625 of the FPGA 607 allows the Host Software 605 to run as multiple threads of execution, each thread of execution may run on different CPU cores 630. This provides a further performance increase to the operation of the Host Software.

Data sent from the FPGA 42, 607 to the host software 605 can be compressed in that the original packet data may be discarded, and only the information needed for the operation of the Host Software in matching traffic data sessions across CGNAT and producing IPAR is sent to the Host Software. In particular, it is preferred that the payload of user packet data is discarded. This reduces the data throughput between the FPGA and the Host Software and improves performance.

FIGS. 7 to 15 illustrate in detail a preferred way in which flow records are generated by incorporating the data passed to the processing units by the FPGA 40. FIGS. 7, 9, 11 and 14 show examples of packets filtered and processed by the FPGA 40 and the data passed to the software running on the host computer, and FIGS. 8, 10, 12, 13 and 15 show data stored at the host computer and the matching process carried out by the host software.

In general, a 5-tuple hash and destination hash is calculated on session control packets and user data packets and used as indexes for accessing the corresponding flow record for those packets in the flow—the 5-tuple hash being used as a non-unique index when creating a flow record, updating a flow record, and deleting a flow record, and the destination hash being used as an index when matching flow records. Metadata is passed with the index hash information and stored in the flow records. This can comprise the 5-tuple values (i.e. not hashed) of addressing information which is used to uniquely identify a flow for a particular 5-tuple hash index, and when creating the correlation record of the addressing information changed by the NAT function. In addition, a payload hash or fingerprint is calculated on user data packets and stored in the flow record for use in matching user data packets. Multiple payload hashes can be stored per flow record. As discussed below, other metadata is preferably also passed and stored in the flow records and may be used for matching. Information relating to subscriber ID in the mobile network may also be passed to the processing unit and stored, allowing this information to be included in the correlation records.

FIG. 7 shows session control packets 701 and 702. The FPGA filters 602 and Keyword Dictionary 603 in FIG. 6 are configured to detect specific session control packets (packets 701 and 702 in FIG. 7) that indicate start and end of a flow (i.e. a series of data packets between two unique endpoints), such as by detecting TCP SYN (indicating start) and TCP FIN or TCP RST indicating end. These keywords are stored in the Keyword Dictionary 603 and read by the filter to match against the packets. Session events 610 corresponding to a matching session control packet are notified to the host software 605.

The FPGA 5-tuple hash block 620 in FIG. 6 calculates a 5-tuple hash on the session control packets 701, 702 based on:

Source IP Address 731
Source IP Port 733
Destination IP Address 730
Destination IP Port 734
IP Protocol 732

Figure 8:
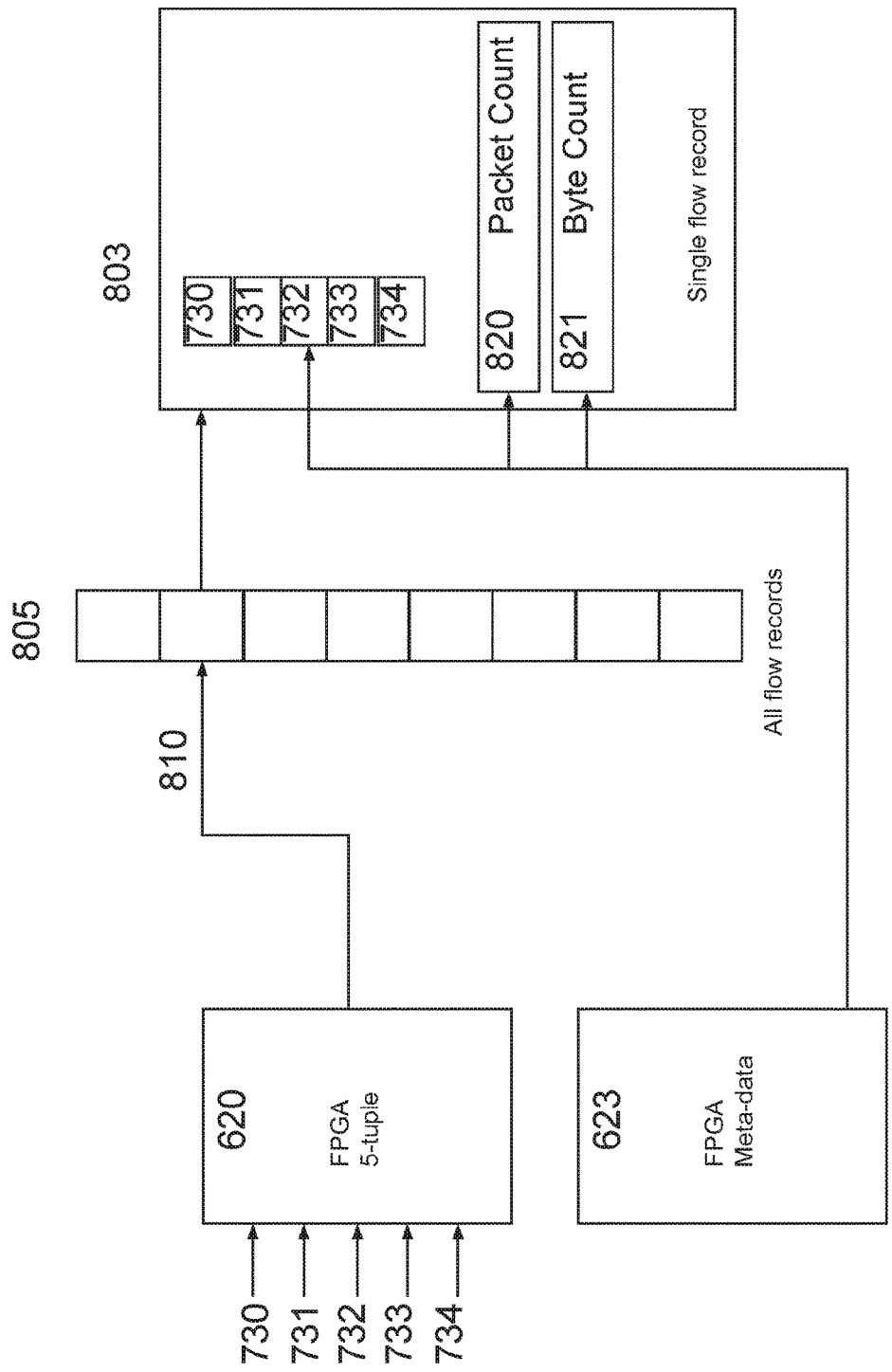
FIG. 8 shows an example of how data output from the FPGA is used by and stored by the probe host software application.

FIG. 8 shows a preferred embodiment of how data output from the FPGA is used by and stored by the function performing the matching and flow monitoring (for example the Host Software 605 in FIG. 6).

The 5-tuple hash value calculated by the FPGA 5-tuple hash block 620 in FIG. 6 and FIG. 7 is passed to the CPU and if the FPGA indicates a session start event 610 from the filter block 602 in FIG. 6 or no previous data record is found by the Host Software, a data record is created by the CPU and held in memory for each flow indexed by the 5-tuple hash. Stateful records are maintained for each flow based on the session control fields, i.e. when a session starts, a new flow record is generated, indexed by the 5-tuple hash and when the flow ends, the flow record is abandoned.

The 5-tuple hash value provides an even distribution of flows across all permissible hash values for a rapid first stage search for a set of (one or more) flow records when accessing a flow record to update the record or delete the record. The same 5-tuple hash value may result from more than one different flow, because of the very large number of flows potentially being processed by the probe, i.e. potentially billions of flows being handled simultaneously from an even larger number of potential combinations of the 5-tuple values which are mapped by the 5-tuple hash function to smaller number of possible hash values.

The FPGA Meta-data block 623 in FIG. 6 recovers individual data fields from the received data packets that can be used by the Host Software to differentiate between different flows that have the same 5-tuple hash value. These include but are not limited to:

(1) Source IP Address 731
(2) Source IP Port 733
(3) Destination IP Address 730
(4) Destination IP Port 734
(5) IP Protocol 732

Thus, when the flow record is created, these five metadata values 730-734 are stored. Subsequently, when updating the record, the 5-tuple hash is used as a rapid initial index into the flow records, and the metadata values 730-734, which are unique to a particular flow, are matched to uniquely identify the particular flow record being updated.

The metadata can include additional values such as, (6) Packet Count 820
(7) Byte Count 821

To allow matching of flow records, and hence addresses, from packets monitored before CGNAT, and packets monitored after CGNAT, flow records are generated for both packets received before CGNAT and separately for packets monitored after CGNAT.

The function performing the matching and flow monitoring (for example the Host Software 605 in FIG. 6) may maintain flow records 805 in FIG. 8 and store the meta-data values passed by the FPGA for later use in matching and measuring flows. Measuring flows means for example counting the number of Bytes in a flow (Byte Count 821) and the number of packets in a flow (Packet Count 820). Other counts may be calculated and stored. These counts may be stored in the flow records 803 and optionally used by the function performing the matching. An example of a single flow record is shown as 803 in FIG. 8.

Figure 9:
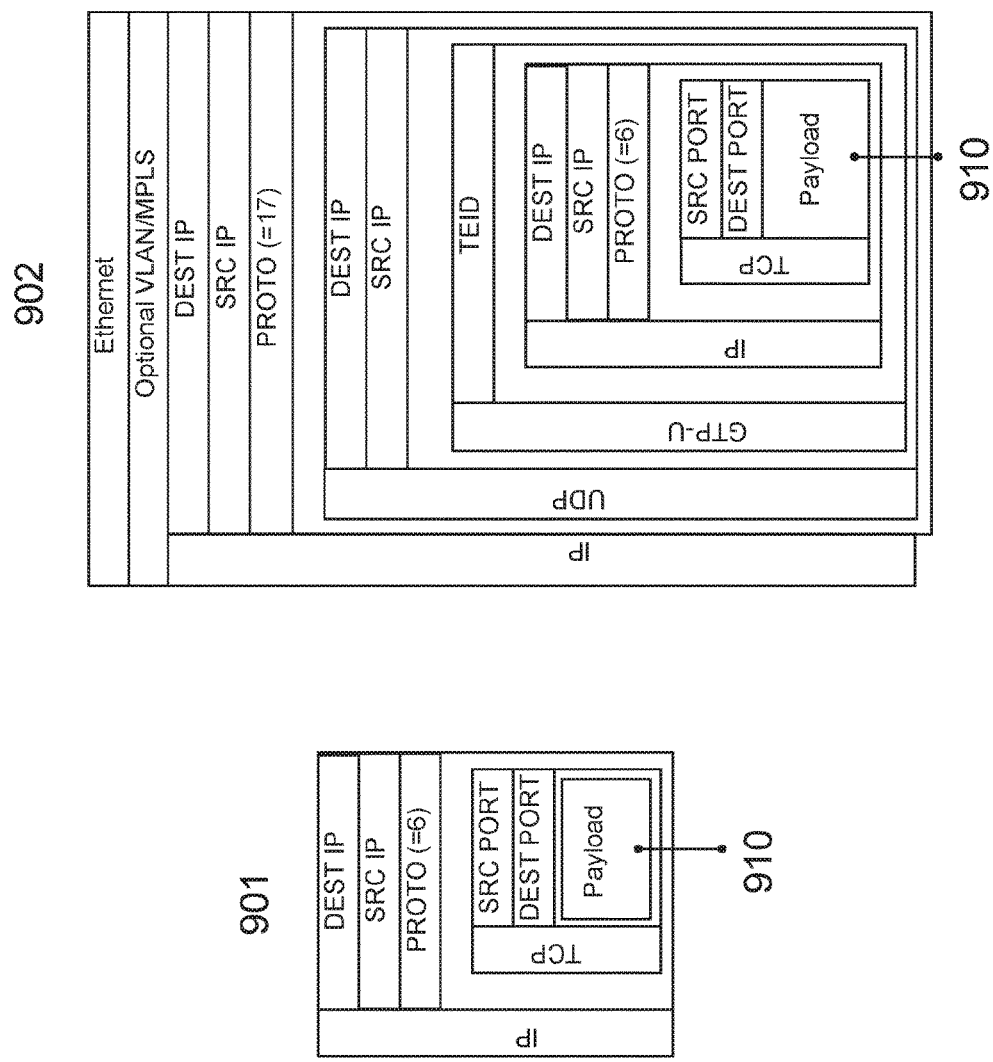
FIG. 9 shows examples of message packet formats carrying payload or application data.

FIG. 9 shows examples of data packets 901, 902 containing Payload (also referred to as user data or application layer data).

When packets containing Payload (packets 901 and 902 in FIG. 9) identified by the FPGA, the FPGA performs further processing of hash values on the identified packets. This hash value can be used to match packets containing Payload on either side of the CGNAT, and allows the function that implements the matching to operate significantly faster as only a single hash value is compared rather than every byte value in each packet.

The Payload hash 1010 (together with the 5-tuple hash 810, metadata and any other hashes) is passed by the FPGA to the function performing the matching and flow monitoring (for example the Host Software 605 in FIG. 6).

Figure 10:
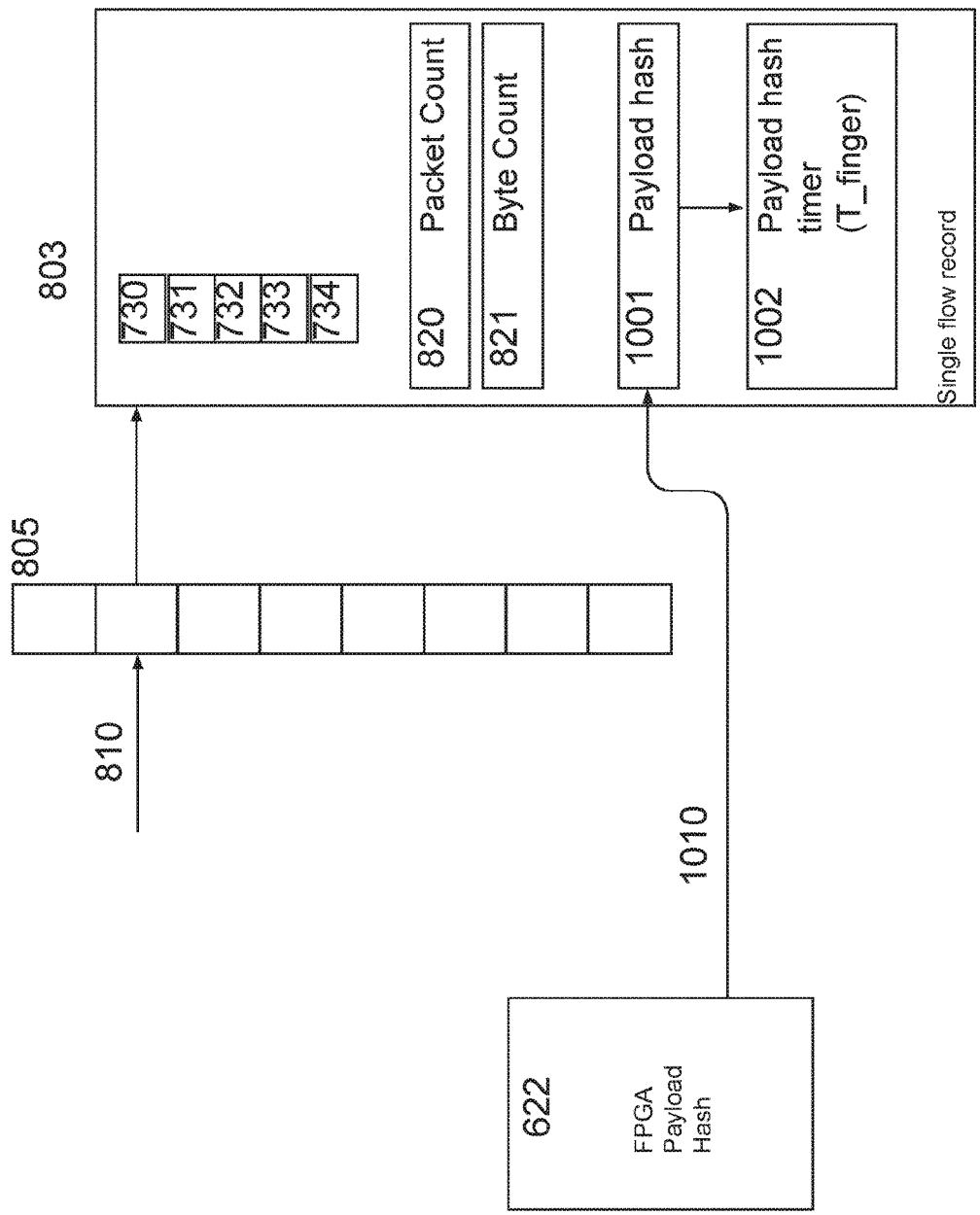
FIG. 10 shows another example of how data output from the FPGA is used by and stored by the probe host software application.

FIG. 10 shows a preferred embodiment where the Host Software 605 stores the previously generated Payload hash values 1001 in flow records 805 indexed by their 5-tuple hash value in FIG. 8 for later use in matching and measuring flows. A Payload hash timer 1002, also referred to as Tfinger started at step 575 in FIG. 5 is started and stored in the flow record 805 to allow the time taken to find a match to be measured and to discard the match if the time period taken to find a match is greater than a pre-set value.

The FPGA 40 can calculate the payload hash on one or more of the user data packets in an individual flow and the function performing the matching and flow monitoring can store one or more payload hash values in each flow record.

Figure 11:
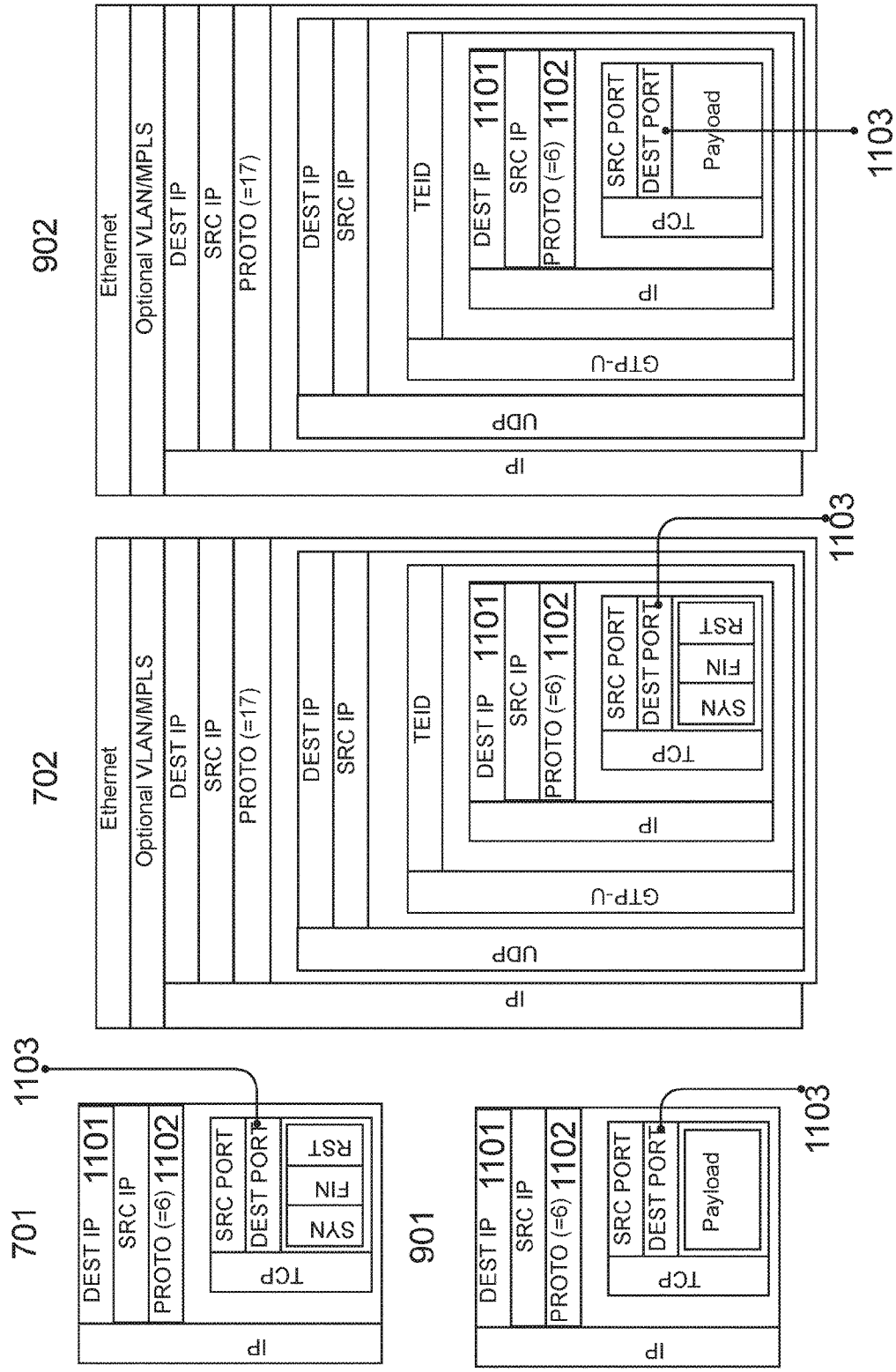
FIG. 11 shows examples of meta-data extracted from message packets by the FPGA.

FIG. 11 shows examples of data packets (702, 902) that can be received on the mobile network 120 side of the CGNAT and examples of data packets (701, 901) that can be received on the Internet 111 side of the CGNAT. In the operation of the CGNAT, for data packets originated from the mobile subscriber UE 100, the following three fields remain unchanged:

(1) Destination IP Address 1101
(2) Destination IP Port 1103
(3) IP Protocol 1102

To facilitate matching of flows either side of the NAT a hash is calculated by the FPGA 3-tuple block 621 in FIG. 6, based on the invariant header fields, i.e. the destination fields (those that are NOT modified by NAT) of each packet. Those fields are:

(1) Destination IP Address 1101
(2) Destination IP Port 1103
(3) IP Protocol 1102

Figure 12:
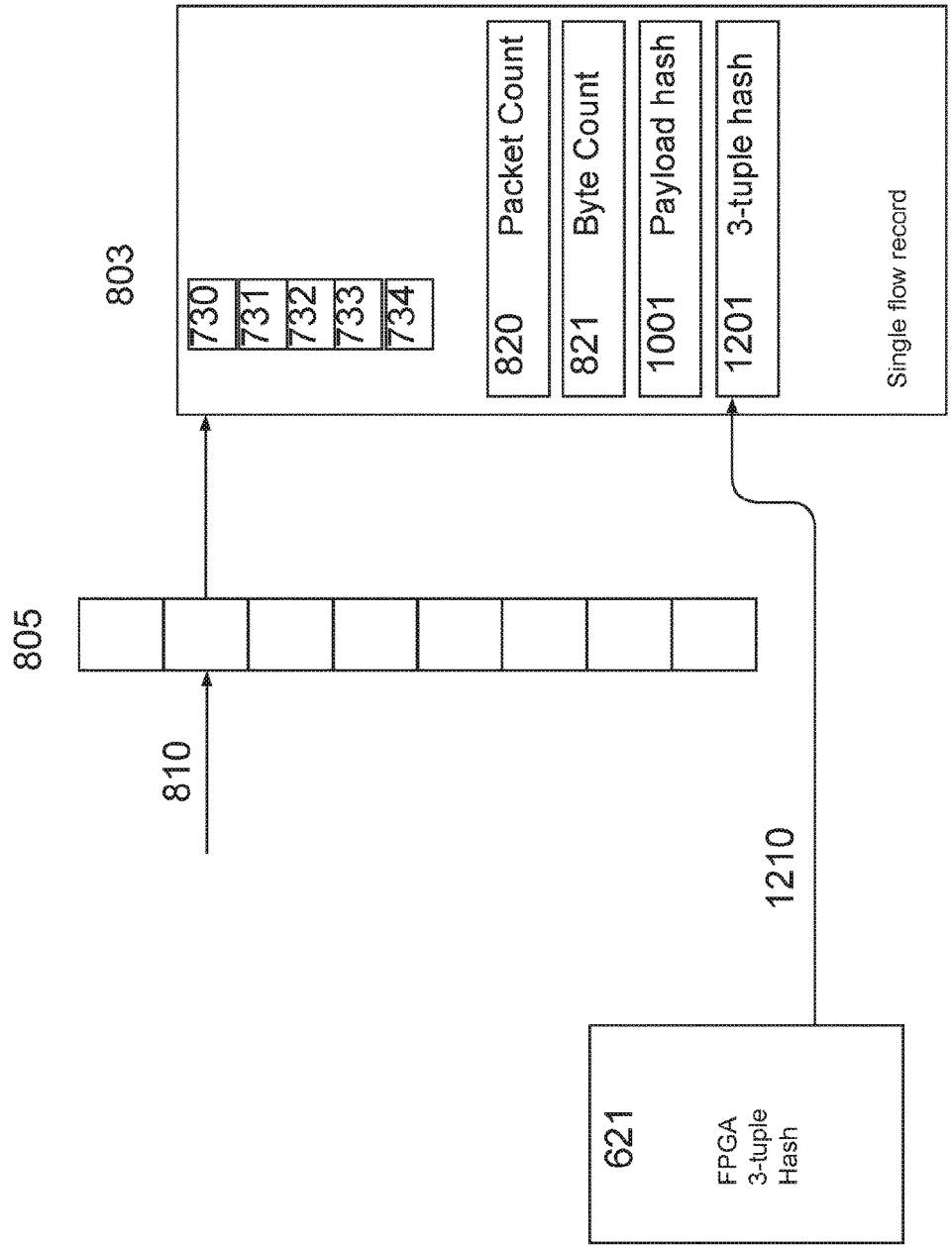
FIG. 12 shows an example of how meta-data output from the FPGA is used by and stored by the probe host software application.

FIG. 12 shows a preferred embodiment where the function performing the matching and flow monitoring (for example the Host Software 605 in FIG. 6) receives the 3-tuple hash values 1201 (together with the 5-tuple hash, metadata and any other hash values) and stores the previously generated 3-tuple hash values 1201 in flow records 805 indexed by their 5-tuple hash value and metadata in FIG. 8 for later use in matching and measuring flows.

Figure 13:
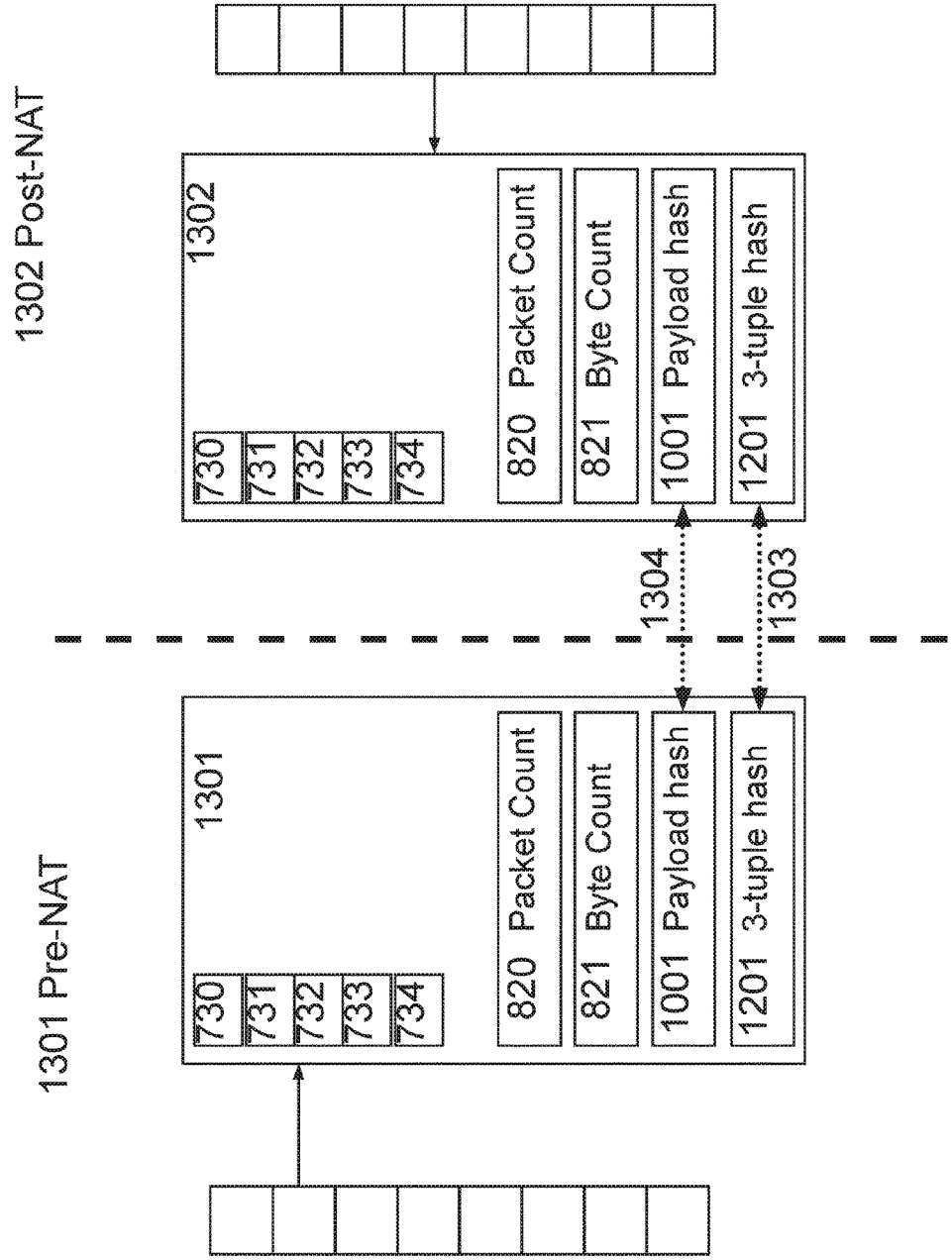
FIG. 13 shows an example of how data provided by the FPGA is used to match sessions from pre and post NAT.
Figure 15:
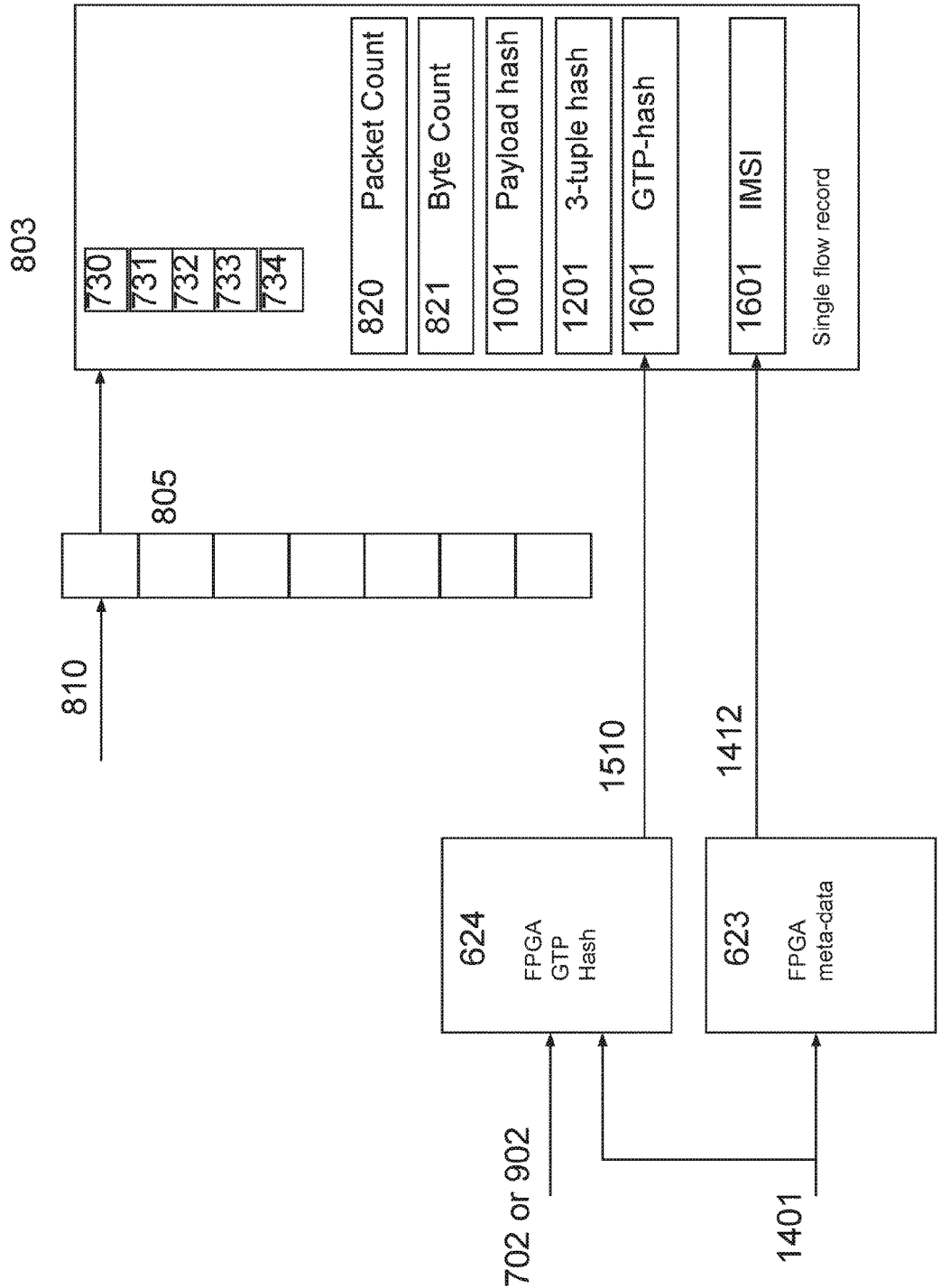

FIG. 13 shows a preferred embodiment where flows are matched across the CGNAT.

For a flow to be matched across CGNAT, the following conditions must be met:

1) The two flows (pre and post NAT) must both have the same destination 3-tuple. Use of a single 3-tuple value accelerates calculating a match as only one value is compared rather than 3 separate values.

2) The application layer (payload) matches for each packet in a flow. As matching the complete set of payload bytes across many flows would be very CPU intensive, an efficient way to achieve this is to calculate a hash of the payload, giving a smaller data value that can be easily compared, which is referred to as a fingerprint herein. An example of a hash function that may be used to perform this task is CRC32. The function performing the match evaluation may choose to test single or multiple packets in a flow.

The 3-tuple hash calculated by the FPGA is used as a key to index candidate flow matches across the CGNAT. This accelerates one stage of matching by avoiding searching through every flow record. The payload comparison is accelerated further by grouping the fingerprints using the destination 3-tuple, as only fingerprints for matching destination 3-tuple need be compared.

3) There is not more than one match reported for a particular payload hash value in a predefined time window.

4) The match is made in a predefined time window.

When a match is found for a pre-CGNAT and post-CGNAT flow record, the fields that have been modified by the CGNAT are copied from the flow records from each flow record and an IPAR record generated. For example, this allows matching of pre-CGNAT address values and post-CGNAT address values.

The above provides a method for matching IP addresses across a NAT. If matching of internal IP address to a mobile subscriber identity is required for the IPAR record, then monitoring of mobile network control protocol messaging, such as GTP-C or RADIUS is required.

This allows parameters to be extracted from the control protocol messaging to identify a mobile subscriber with identities such as IMSI, MSISDN, IMEI (where present), and also associate this control protocol message, and hence mobile subscriber identify, with a flow, using a parameter that is present in both the flow record and control protocol messaging. For example, in the case of GTP-C this can be the TEID (Tunnel End-point Identifier) or for RADIUS an internal, pre-NAT, subscriber IP address.

FIG. 14 shows examples of data packets (1401, 1402) that can be received on the mobile network side of the CGNAT that can be used to match a mobile subscriber identity to an IPAR. This example shows GTP-C but other control protocols containing mobile subscriber identity, such as but not limited to RADIUS may be used.

In this example, the data packet 1401 is a GTP-C control message and contains TEID (Tunnel Endpoint ID) and also IMSI and GTP-U message 702, 902 contains the same TEID.

To allow rapid searching and matching of subscriber identities, the fields used to match identities can be hashed by the GTP hash 624 function, and the hash value used as an index into correlation records. In the example shown in FIG. 14 these fields are (1) Destination IP address 1410
(2) TEID 1411

Hashing allows a single value to be used for comparison rather than multiple values and speeds up processing.

This GTP hash value 1510 is passed to the function performing the matching and flow monitoring (for example the Host Software 605 in FIG. 6) together with the subscriber identity 1412 extracted by the metadata block 623. The Host Software 605 stores the GTP hash values 1601 generated by the FPGA GTP hash block 624 together with the subscriber identity 1601 in the appropriate flow records 805 in FIG. 8.

The FPGA speeds up processing and allows tens of millions of flows to be compared in real time in numerous ways. Session control packets are identified by the FPGA and reported separately to the host software application. This enables flow records to be generated and abandoned quickly.

The 5-tuple initial index hash is generated by the FPGA offloading this processing from the host CPU. The second 3-tuple hash is generated by the FPGA offloading this processing from the host CPU. The payload hash is calculated by the FPGA offloading this processing from the host CPU. Since the payload hash is calculated by the FPGA, application layer data is not reported to the host CPU, vastly reducing the throughput of data on the system PCIe bus, releasing resources.

The FPGA can also identify specific control protocol messages to be used for subscriber identity correlation offloading searching and detection of these specific data packets from the host. Specific fields can be extracted from the control protocol messages to accelerate comparison. The FPGA can also calculate the hash value of specific fields to enable rapid indexing of correlation records.

The software can set the matching criteria at runtime. Thus, the number of packets to be matched, and the attributes, e.g. packet size, can be turned on/off.

The matching process can match in either direction, i.e. packets travelling from mobile network to global internet, or from global internet to mobile network, or both directions.

In further embodiments, the probe may additionally selectively retain data as required by legislative rules. The data retained may comprise:

(a) the visited high level web address, i.e. the visited web address up to the first "/" (for example http://america.aljazeera.com/articles/2014/7/10/uk-rushing-to-passlawtokeepuserdatastored.html is stored as http://America.aljazeera.com)

(b) the individual's IP Address within the CN;

(c) the date and time the web session started, i.e. when the high level visited web address is first accessed. NB this may be different to the time the GTP-U tunnel is first created.

(d) the duration of the session. This equates to the amount of time spent by a subscriber on a particular website, which can be derived by comparing the timestamp assigned by the probe for the first high level web address access with for example just "www.bbc.com/" with the timestamp of the last URL access with the same high level web address; and (e) the number of web pages visited, i.e. a simple count of the web pages visited on that particular site, i.e. with that high level web address.

The individual URLs are not retained in the records written to storage so to avoid creating a "web-log" of a subscriber's activity which may contravene what is permitted under legislative provisions.

Thus, in the described scenario, the probe 10 is deployed to provide full CD records for data retention purposes. These records provide, for example, mobile subscriber identity (IMSI), time and high level url truncated at the first "/".

Under some jurisdictions, url identity beyond the first "/" is considered as session content and may not be examined or retained. For example, "www.bbc.com/" is acceptable, but "www.bbc.com/sport" is not.

To enable the probe to do this it must be able to access the signalling and user data within the mobile core network. By processing the signalling data to learn subscriber ownership of the user data, and by applying CD retention processing to the user data the probe is able to generate all the meta-data required for data retention and attribute it to a single IMSI.

The FPGA may be used to perform both fixed and variable position signature and pattern scanning in each packet received in order to find events of significance that need to be recorded as part of Communication Data retention records, variable position scanning being very processor intensive if implemented in software alone. For example, the FPGA powered DPI looks within GTP-U tunnels for specific events significant to generating CD data records, e.g. 'GET /', signifying the subscriber is requesting a webpage from a remote server 110 on the internet. This allows for pre-programmed significant events, programmed as keywords and signatures in the FPGA, such as start of web browsing, to be delivered to Host Software, where they can be added to flow records and or included in CD records.

This technique of offloading processing within the FPGA enables significantly higher data rates to be processed by the monitoring system, in excess of the 10 Gbps achievable in current software implementations and beyond 100 Gbps in current designs.

Embodiments of the present disclosure have been described with particular reference to the examples illustrated. However, it will be appreciated that variations and modifications may be made to the examples described within the scope of the present disclosure.

The invention claimed is:

1. A data retention probe for a packet-switched, mobile telecommunications network, the mobile network being arranged to forward packets between subscriber units and a gateway node, wherein the gateway node translates internal IP addresses used within the mobile network to global IP addresses and port numbers used outside the mobile network in the global internet, the probe comprising:
   a first interface arranged to connect to an interface carrying traffic on the mobile network side of the gateway node;
   a second interface arranged to connect to an interface carrying traffic on the global internet side of the gateway node;
   a FPGA arranged to process packets on the mobile network seen via the first interface and on the global internet side seen via the second interface to create for each packet at least one fingerprint of one or more fields in the packets that are unchanged as part of the address translation performed by the gateway node and to create metadata for those packets comprising addressing information for those packets;
   a processing unit in communication with the FPGA arranged to receive from the FPGA the fingerprints and metadata and to maintain flow records for each flow of packets seen on each side of the gateway node,
   the processing unit being further arranged to compare the fingerprints of said packets in the flow records for the mobile network and global internet respectively and, where a match is found, to determine those packets to be part of the same communication session, and, where packets are determined to be part of the same communication session, create a record correlating internal IP address or a subscriber identifier within the mobile network to external IP address and port number for those packets.

2. A data retention probe according to claim 1, wherein the FPGA is arranged to filter TCP session control events and passes these events to the processing unit together, and wherein the processing unit is arranged to maintain stateful flow records for packets seen on both sides of the gateway node.

3. A data retention probe according to claim 1, wherein the FPGA is arranged to create a fingerprint for the application data portions of said packets and passes the fingerprints to the processing unit which is arranged to store the fingerprint in the flow record for that flow and to compare the fingerprints in flow records for packets seen on each side of the gateway node to identify a match.

4. A data retention probe according to claim 1, wherein the FPGA is arranged to calculate a hash value on the 5-tuple of addressing information in the packets and wherein the processing unit is arranged to maintain flow records for packets seen on each side of the gateway node indexed by the 5-tuple hash.

5. A data retention probe according to claim 4, wherein the metadata includes the 5-tuple of addressing information in packets, wherein the processing unit is arranged to maintain flow records for packets seen on each side of the gateway node indexed by a non-unique 5-tuple hash and using the 5-tuple addressing information values to uniquely identify a flow record for that flow.

6. A data retention probe according to claim 1, wherein the FPGA is arranged to also calculate a hash value of destination addressing information in the packets which is also passed to the processing unit, the processing unit being arranged to store the destination hash in the flow records and to compare the destination hash in flow records for packets seen on each side of the gateway node to identify a match.

7. A data retention probe according to claim 6, wherein the fingerprints are grouped according to the destination hash in the flow records, such that, when identifying a match between the flow records seen on each side of the gateway node, the processing unit first identifies in the respective flow records a match between the destination hashes, and then identifies a match between fingerprints associated with the matching destination hashes.

8. A data retention probe according to claim 1, wherein the processing unit is arranged to determine packets to be part of the same communication session only when said packets with matching application data fingerprint and/or destination hash are seen on the mobile network and global internet respectively within a predetermined time period.

9. A data retention probe according to claim 1, wherein multiple packets are matched within the time period to determine the packets belong to the same flow.

10. A data retention probe according to claim 4, comprising plural processing units each arranged to match a subset of flow records for one side of the gateway node with flow records on the other side of the gateway node, wherein the FPGA load balances between the plural processing units according to the 5-tuple hash value.

11. A data retention probe according to claim 1, wherein the FPGA is arranged to identify tunnel control packets on the mobile network and to calculate a hash of one or more fields in a tunnelled packet, the fields including at least the tunnel identifier, and to pass the hash to the processing unit together with metadata identifying the subscriber, the processing unit arranged to store a record of tunnels correlated to subscriber identifier indexed by said hash value, the FPGA being further arranged to calculate a hash of said fields in session control packets and/or user data packets seen on the mobile network and to pass the hashes to the processing unit, and if a match is found, the processing unit is arranged to lookup the subscriber identifier in the record using the received hash value for that flow and to store the subscriber identifier in the flow record.

12. A method of carrying out data retention for a packet-switched, mobile telecommunications network, the mobile network being arranged to forward packets between subscriber units and a gateway node, wherein the gateway node translates internal IP addresses used within the mobile network to global IP addresses and port numbers used outside the mobile network in the global internet, the method comprising:
   connecting to the mobile network side of the gateway node and connecting to the global internet side of the gateway node;
   processing with a FPGA packets on the mobile network seen via the first interface and on the global internet side seen via the second interface to create for each packet at least one fingerprint of one or more fields in the packets that are unchanged as part of the address translation performed by the gateway node and to create metadata for those packets comprising addressing information for those packets;
   receiving at a processing unit from the FPGA the fingerprints and metadata and maintaining flow records with the processing unit for each flow of packets seen on each side of the gateway node;
   comparing with the processing unit the fingerprints of said packets in the flow records for the mobile network and global internet respectively and, where a match is found, determining those packets to be part of the same communication session; and, where packets are determined to be part of the same communication session, creating a record correlating internal IP address or a subscriber identifier within the mobile network to external IP address and port number for those packets.

13. A method according to claim 12, wherein the FPGA filters TCP session control events and passes these events to the processing unit, and wherein the processing unit stores stateful flow records for packets seen on each side of the gateway node.

14. A method according to claim 12, wherein the FPGA creates a fingerprint for the application data portions of said packets and passes the fingerprints to the processing unit which stores the fingerprints in the flow record for that flow and compares the fingerprints in flow records for packets seen on each side of the gateway node to identify a match.

15. A method according to claim 12, wherein the FPGA calculates a hash value on the 5-tuple of addressing information in the packets and wherein the processing unit maintains flow records for packets seen on each side of the gateway node indexed by the 5-tuple hash.

16. A method according to claim 15, wherein the metadata includes the 5-tuple of addressing information in packets, wherein the processing unit maintains flow records for packets seen on each side of the gateway node indexed by a non-unique 5-tuple hash and using the 5-tuple addressing information values to uniquely identify a flow record for that flow.

17. A method according to claim 12, wherein the FPGA calculates a hash value of destination addressing information in the packets comprising destination port, destination IP address and protocol which is also passed to the processing unit, the processing unit storing the destination hash in the flow records and comparing the destination hash in flow records for packets seen on each side of the gateway node to identify a match.

18. A method according to claim 17, wherein the fingerprints are grouped according to the destination hash in the flow records, such that, when identifying a match between the flow records seen on each side of the gateway node, the processing unit first identifies in the respective flow records a match between the destination hashes, and then identifies a match between fingerprints associated with the matching destination hashes.

19. A method according to claim 12, wherein the processing unit determines packets to be part of the same communication session only when said packets with matching application data and/or destination hash are seen on the mobile network and global internet respectively within a predetermined time period.

20. A method according to claim 12, wherein multiple packets are matched within the time period to determine the packets belong to the same flow.

* * * * *